(12) United States Patent
Ishihara et al.

(10) Patent No.: US 9,617,714 B2
(45) Date of Patent: Apr. 11, 2017

(54) HYBRID CONSTRUCTION MACHINE

(71) Applicant: Hitachi Construction Machinery Co., Ltd., Tokyo (JP)

(72) Inventors: Shinji Ishihara, Tokyo (JP); Masatoshi Hoshino, Tsuchiura (JP); Kentarou Itoga, Tsuchiura (JP); Hidekazu Moriki, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 53 days.

(21) Appl. No.: 14/689,200

(22) Filed: Apr. 17, 2015

(65) Prior Publication Data

US 2015/0354170 A1    Dec. 10, 2015

(30) Foreign Application Priority Data

Jun. 10, 2014   (JP) .................. 2014-119907

(51) Int. Cl.
| | |
|---|---|
| *E02F 9/20* | (2006.01) |
| *B60W 10/06* | (2006.01) |
| *B60W 10/08* | (2006.01) |
| *B60W 20/00* | (2016.01) |
| *E02F 9/22* | (2006.01) |
| *B60W 20/10* | (2016.01) |
| *B60W 20/13* | (2016.01) |

(52) U.S. Cl.
CPC ........... *E02F 9/2075* (2013.01); *B60W 10/06* (2013.01); *B60W 10/08* (2013.01); *B60W 20/10* (2013.01); *B60W 20/13* (2016.01); *E02F 9/2217* (2013.01); *B60W 2400/00* (2013.01); *B60W 2530/10* (2013.01); *B60W 2710/0644* (2013.01); *B60W 2710/0666* (2013.01); *B60W 2710/081* (2013.01); *B60W 2710/083* (2013.01); *Y10S 903/93* (2013.01)

(58) Field of Classification Search
CPC ..... E02F 9/2075; B60W 20/10; B60W 20/15; B60W 10/06; B60W 10/08
See application file for complete search history.

(56) References Cited

U.S. PATENT DOCUMENTS

| | | | |
|---|---|---|---|
| 7,728,449 B2 | 6/2010 | Kagoshima et al. | |
| 2003/0226291 A1* | 12/2003 | Naruse | E02F 9/2221 37/348 |

(Continued)

FOREIGN PATENT DOCUMENTS

JP    4800514 B2    8/2011

*Primary Examiner* — Adam Mott
(74) *Attorney, Agent, or Firm* — Mattingly & Malur, PC

(57) ABSTRACT

The hybrid constructions machine has an engine rotation speed sensor 11A to detect a rotation speed NE of an engine 11, an engine state determination unit 20B to determine the state of output torque TE of the engine 11, a load torque estimation unit 20C to calculate load torque TP of a hydraulic pump 13, and an engine assistance limiting unit 20E to, when the rotation speed NE detected with the engine rotation speed sensor 11A is equal to or greater than a rotation speed N0, and the engine state determination unit 20B determines that the output torque TE of the engine 11 has not become minimum torque Tmin, or the load torque TP calculated with the load torque estimation unit 20C is lower than torque T1, limit motive-power assistance with the motor generator 12 to the engine 11.

7 Claims, 15 Drawing Sheets

(56) References Cited

U.S. PATENT DOCUMENTS

2010/0332088 A1* 12/2010 Okano .................. B60K 25/02
 701/50
2013/0057305 A1* 3/2013 Jimbo .................. B60L 11/005
 324/750.01
2013/0317710 A1* 11/2013 Sakurai ................ E02F 9/2025
 701/50

* cited by examiner

FIG. 13

|  | BOOST PRESSURE PT | |
|---|---|---|
|  | LOW | HIGH |
| LOAD TORQUE TP — LOW | IDLING STATE | POWER GENERATION STATE |
| LOAD TORQUE TP — HIGH | EXCESSIVE ASSISTANCE STATE | HEAVY LOAD WORK |

HYBRID CONSTRUCTION MACHINE

BACKGROUND

1. Field of the Invention

The present invention relates to a hybrid construction machine having a motor generator to assist motive power of an engine and generate electric power.

2. Description of the Related Art

In recent years, a construction machine driven with a hydraulic system has a large engine selected in anticipation of operation under maximum load to perform all the operations under light to heavy load. However, an operation under heavy load is merely a part of the entire work with the construction machine. Accordingly, the engine performance is redundant upon work under light and intermediate load, which is not preferable in terms of fuel efficiency.

On the other hand, as disclosed in e.g. Japanese Patent No. 4800514, conventionally known is a hybrid construction machine having a hybrid system. In the construction machine, an engine is downsized, however, shortage of engine output accompanying downsizing of the engine is complemented with output torque of a motor generator having quick output response, to improve fuel efficiency.

However, in this hybrid construction machine, when engine assistance conditions such as engine speed and load are satisfied, engine motive power is assisted with the motor generator. Accordingly, even when assistance is not required (or is redundant), the assistance operation with the motor generator may be continued in some cases. In such case, electric power accumulated in a power storage device to supply/receive electric power to/from the motor generator is wasted, or over discharge from the power storage device is caused. It is not preferable in terms of energy saving. Further, there is a possibility that the life of the power storage device is shortened.

Accordingly, as disclosed in e.g. U.S. Pat. No. 7,728,449, a proposed conventional technique is a structure having a control unit to control motive-power assistance with a motor generator to an engine, and an operation state detection unit to detect an engine stall state or an operation state directly connected to engine stall. When the engine stall state or the operation state directly connected to engine stall has been detected with the operation state detection unit, the motive-power assistance with the motor generator to the engine is automatically stopped.

In this U.S. Pat. No. 7,728,449, the operation state detection unit includes an engine speed detection unit to detect an actual engine speed, and an assistance/stop determination unit to obtain a deviation between the actual engine speed detected with the engine speed detection unit and a target speed, and when the deviation is equal to or greater than a previously-set value, determine to stop the motive-power assistance to the engine.

In the hybrid construction machine having a motor generator as disclosed in the above-described conventional techniques, the power storage device has a large capacity. In the hybrid construction machine having the large capacity power storage device, when the hydraulic load required in the hydraulic system is lower than the maximum motive power of the motor generator upon operation under light or intermediate load, it is possible to support the hydraulic load only with the output torque of the motor generator even though the engine output torque is maintained in an extremely low state. In this situation, unnecessary engine motive-power assistance is performed with the motor generator. There is a possibility that motoring occurs, i.e., the engine does not effectively function and wastefully rotates with the output torque of the motor generator, and engine overspeed easily occurs. With this phenomenon, it is conceivable that a problem such as damage to the engine or thermal effect on the engine occurs.

Further, according to the conventional technique disclosed in the U.S. Pat. No. 7,228,449, when it is possible to support the hydraulic load only with the output torque of the motor generator as described above, it is possible to control the engine speed without causing a deviation between the actual engine speed detected with the engine speed detection unit and the target speed. Accordingly, since it is impossible for the operation state detection unit to appropriately detect engine stall or an operation state directly connected to the engine stall, it is not possible to stop unnecessary engine motive-power assistance with the assistance/stop determination unit. This might cause waste of electric power accumulated in the power storage device and over discharge from the power storage device.

Especially, in the hybrid construction machine, there are a comparatively small number of opportunities to recall regenerative energy in the power storage device. When the electric power accumulated in the power storage device is lowered, the engine is driven so as to charge the power storage device. The engine is loaded for the driving and fuel is used, thus the fuel efficiency in the entire work is degraded. Accordingly, it is necessary to ensure the electric power in the power storage device as much as possible even upon operation under light or intermediate load. Further, it is desired that the motor generator is efficiently used to realize energy saving.

SUMMARY

The present invention has been made in view of the above-described situation of the conventional techniques, and has its object to provide a hybrid construction machine capable of suppressing unnecessary engine motive-power assistance with a motor generator to an engine.

To attain the above-described object, a hybrid construction machine according to the present invention comprises: an engine; a hydraulic pump driven with the engine; a hydraulic working unit driven with pressure oil discharged from the hydraulic pump; a motor generator that transmits torque to the engine, and performs motive-power assistance to the engine and power generation; a power storage device that supplies/receives electric power to/from the motor generator; an engine rotation speed detection unit that detects a rotation speed of the engine; an engine state determination unit that determines a state of output torque of the engine; a load torque detection unit that detects load torque of the hydraulic pump; and an engine assistance limiting unit that, when the rotation speed of the engine detected with the engine rotation speed detection unit is equal to or greater than a predetermined rotation speed, and the engine state determination unit determines that the output torque of the engine has not become predetermined minimum torque, or the load torque of the hydraulic pump detected with the load torque detection unit is lower than predetermined torque, limits the motive-power assistance with the motor generator to the engine.

In the present invention having the above configuration, when it is determined that the engine rotation speed detected with the engine rotation speed detection unit is equal to or greater than a predetermined rotation speed and the engine state determination unit determines that the engine output torque has not become a predetermined minimum torque, a situation where the hydraulic load is supported only with the output torque of the motor generator occurs. In this case, it is possible to suppress such unnecessary motive-power assistance with the motor generator to the engine by limiting motive-power assistance with the motor generator to the engine with the engine assistance limiting unit. Accordingly, it is possible to avoid occurrence of engine motoring due to output torque of the motor generator. With this arrangement, it is possible to reduce load on the engine accompanying motoring.

Further, in the present invention, when the load torque of the hydraulic pump detected with the pump load detection unit is lower than predetermined torque, a situation that the torque to be outputted from the engine is made by the motive-power assistance with the motor generator to the engine occurs. In this case, it is possible to suppress such unnecessary motive-power assistance to the engine with the output torque of the motor generator by limiting the motive-power assistance with the motor generator to the engine with the engine assistance limiting unit. Accordingly, it is possible to reduce waste of electric power accumulated in the power storage device, and it is possible to prevent wasteful discharge from the power storage device.

Further, as preferable aspects of the hybrid construction machine according to the present invention, the following configurations are given.

(1) In the present invention, the hybrid construction machine according to the present invention comprises a fuel injection amount detection unit to detect a fuel injection amount of the engine. The engine state determination unit determines the state of output torque of the engine based on the fuel injection amount of the engine detected with the fuel injection amount detection unit.

(2) In the present invention, the hybrid construction machine according to the present invention comprises a turbo charger type supercharger provided in the engine and a boost pressure measuring unit to measure boost pressure of the engine with the supercharger. The engine state determination unit determines the state of the output torque of the engine based on the load torque of the hydraulic pump detected with the load torque detection unit and the boost pressure of the engine measured with the boost pressure measuring unit.

(3) Further, in the present invention, the hybrid construction machine according to the present invention comprises a motor generator torque detection unit to detect output torque of the motor generator. The engine state determination unit determines the state of the output torque of the engine based on the load torque of the hydraulic pump detected with the load torque detection unit, and the output torque of the motor generator detected with the motor generator torque detection unit.

(4) Further, in the present invention, the hybrid construction machine according to the present invention comprises at least one of a motor generator rotation speed detection unit to detect the rotation speed of the motor generator and a motor generator current detection unit to detect an electric current inputted in the motor generator. The engine state determination unit determines the state of the output torque of the engine based on at least one of the rotation speed of the motor generator detected with the motor generator rotation speed detection unit and the electric current inputted in the motor generator detected with the motor generator current detection unit.

With any of these configurations, it is possible to omit an actual torque detection unit to detect actual torque actually outputted from the engine since it is not necessary to directly detect the output torque of the engine. With this arrangement, it is possible to realize determination of the state of the output torque of the engine with the engine state determination unit with a simple configuration.

Further, in the present invention, the hybrid construction machine according to the present invention comprises a target rotation speed setting unit to set a target rotation speed of the engine. Even when the rotation speed of the engine detected with the engine rotation speed detection unit is equal to or greater than the predetermined rotation speed and the engine state determination unit determines that the output torque of the engine has become the predetermined minimum torque, or the load torque of the hydraulic pump detected with the load torque detection unit is equal to or greater than the predetermined torque, the engine assistance limiting unit limits motive-power assistance with the motor generator to the engine when the target rotation speed of the engine set with the target rotation speed setting unit is lower than the rotation speed of the engine detected with the engine rotation speed detection unit.

In the present invention having the above configurations, when a state where the rotation speed of the engine (actual rotation speed) is over the target rotation speed, i.e., so-called over revolution (over rev.) occurs, the engine assistance limiting unit limits motive-power assistance with the motor generator to the engine. With this arrangement, since it is possible to suppress promotion of over revolution with the output torque of the motor generator, it is possible to reduce damage to the engine accompanying the over revolution.

Further, in the present invention, the hybrid construction machine according to the present invention comprises a target rotation speed setting unit to set a target rotation speed of the engine. Even when the load torque of the hydraulic pump detected with the load torque detection unit is lower than the predetermined torque, the engine assistance limiting unit does not limit the motive-power assistance with the motor generator to the engine when the engine state determination unit determines that the output torque of the engine has not become the predetermined minimum torque and the target rotation speed of the engine set with the target rotation speed setting unit is higher than the rotation speed of the engine detected with the engine rotation speed detection unit, until the engine state determination unit determines that the output torque of the engine has become the predetermined minimum torque.

In the present invention as described above, when the engine state determination unit determines that the output torque of the engine has not become predetermined minimum torque as in the case of engine stop state, even when the target rotation speed setting unit sets the target rotation speed of the engine with a value higher than the rotation speed of the engine, the motive-power assistance with the motor generator to the engine is not limited. Accordingly, it is possible to use the motor generator in place of a starter motor provided in the engine. With this arrangement, since it is possible to quickly raise the rotation speed of the engine, it is possible to quickly start the engine.

According to the hybrid construction machine of the present invention, it is possible to suppress unnecessary motive-power assistance with the motor generator to the engine.

BRIEF DESCRIPTION OF THE DRAWINGS

Non-limiting and non-exhaustive embodiments of the present embodiments are described with reference to the following figures, wherein like reference signs refer to like parts throughout the various views unless otherwise specified.

FIG. 13 is a table showing the limiting function of the engine assistance limiting unit shown in FIG. 11.

DETAILED DESCRIPTION

Hereinbelow, embodiments to implement a hybrid construction machine according to the present invention will be described based on the drawings.

First Embodiment

Figure 1:
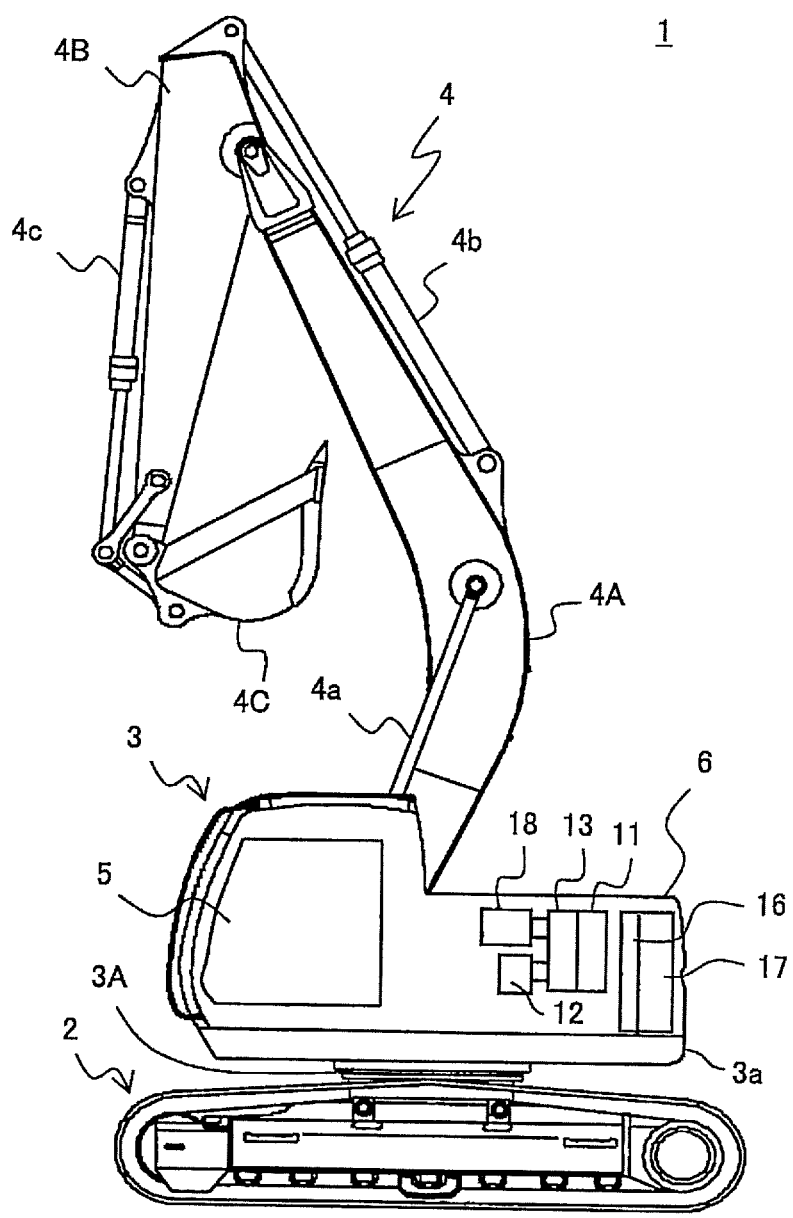
FIG. 1 is a side elevation showing the structure of a hybrid hydraulic excavator as a first embodiment of a hybrid construction machine according to the present invention.

FIG. 1 is a side elevation illustrating the structure of a hybrid hydraulic excavator as a first embodiment of the hybrid construction machine according to the present invention.

The first embodiment of the hybrid construction machine according to the present invention is applied to e.g. a hybrid hydraulic excavator (hereinbelow, referred to as a "hydraulic excavator" for the sake of convenience) 1 as shown in FIG. 1. The hydraulic excavator 1 has a travelling body 2, a revolving superstructure 3 rotatably provided on the travelling body 2 via a revolving frame 3a, a swing gear 3A which is provided between the travelling body 2 and the revolving superstructure 3 and on which a swing motor 3A1 (see FIG. 2) to revolve the revolving superstructure 3 is mounted, and a front work machine 4 as a hydraulic working unit which is attached to the front part of the revolving superstructure 3 and which rotates in upward and downward directions to perform work such as excavation.

The revolving superstructure 3 has a cab 5 provided on the front part of the revolving frame 3a, and an engine room 6 which is provided on a rear part of the revolving frame 3a and in which an engine 11 (see FIG. 2) to be described later is accommodated. The cab 5 has an operating lever (not shown) to enable desired operations of the respective hydraulic actuators 3A1, and 4a to 4c such as a swing motor 3A1, a boom hydraulic cylinder 4a to be described later, an arm hydraulic cylinder 4b, and a bucket hydraulic cylinder 4c, which is grasped and manipulated by an operator in the cab 5, and an engine control dial (see FIG. 3) as a target rotation speed setting unit to select a working mode such as an economy mode as a mode to perform light load or intermediate load work such as light excavation work or smoothing work and a high load mode to perform higher load work than the economy mode, and to set a target rotation speed Wref (see FIG. 6) of the engine 11 in each working mode.

The front work machine 4 has a boom 4A, with its rear anchor rotatably attached to the revolving frame 3a, which rotates in upward and downward directions, an arm 4B rotatably attached to an end of the boom 4A, and a bucket 4C rotatably attached to an end of the arm 4B. Further, the front work machine 4 has the boom hydraulic cylinder 4a which connects the revolving superstructure 3 to the boom 4A, and expands/contracts to rotate the boom 4A, the arm hydraulic cylinder 4b which connects the boom 4A to the arm 4B, and expands/contracts to rotate the arm 4B, and the bucket hydraulic cylinder 4c which connects the arm 4B to the bucket 4C, and expands/contracts to rotate the bucket 4C.

Figure 2:
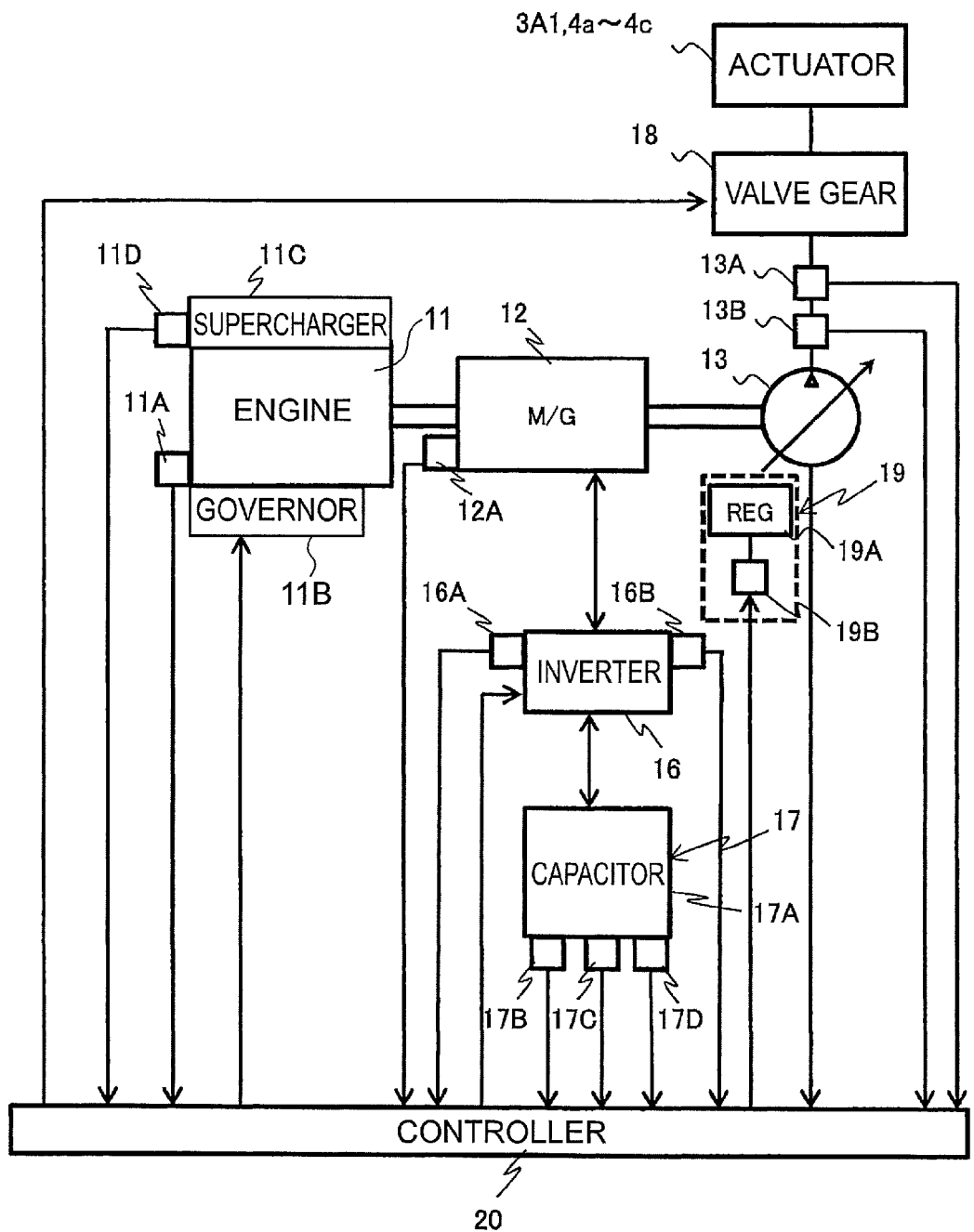
FIG. 2 is a block diagram showing a configuration of substantial parts of the hybrid hydraulic excavator according to the first embodiment of the present invention.

FIG. 2 is a block diagram showing a configuration of the revolving superstructure 3.

As shown in FIGS. 1 and 2, the revolving superstructure 3 has the above-described engine 11, an engine rotation speed sensor 11A as an engine rotation speed detection unit to detect a rotation speed NE (see FIG. 6) of the engine 11, a fuel tank (not shown) to store fuel of the engine 11, a governor 11B to control a fuel injection amount of the engine 11, a turbo charger type supercharger 11C provided in the engine 11, and a boost pressure sensor 11D as a boost pressure measuring unit to measure boost pressure of the engine 11 with the supercharger 11C.

Further, the revolving superstructure 3 has a motor generator 12, which is provided on a driving shaft of the engine 11 and which performs motive-power assistance to the engine 11 and power generation by torque transmission to/from the engine 11, a motor generator rotation speed sensor 12A as a motor generator rotation speed detection unit to detect a rotation speed NM (see FIG. 10A and FIG. 10B) of the motor generator 12, and a variable displacement hydraulic pump (hereinbelow, referred to as a "hydraulic pump" for the sake of convenience) 13, which is serially connected to the engine 11 and the motor generator 12 and which operates with a driving force of the engine 11 and the motor generator 12, to discharge pressure oil.

The hydraulic pump 13 has e.g. a swash plate (not shown) as a variable displacement mechanism. The flow amount of the pressure oil discharged from the hydraulic pump 13 is controlled by adjusting a titled angle of the swash plate. Further, the hydraulic pump 13 is provided with a discharge pressure sensor 13A to measure the pressure of the discharged pressure oil, a discharge flow rate sensor 13B to measure the flow rate of the discharged pressure oil, a tilted angle sensor (not shown) to measure the tilted angle of the swash plate of the hydraulic pump 13, and the like. Note that in the present embodiment, the hydraulic pump 13 is a variable displacements wash plate type hydraulic pump. The hydraulic pump 13 is not limited to this type, but it may be a bent axis type pump or the like as long as it has a function of controlling the flow rate of the discharged pressure oil.

Further, the revolving superstructure 3 has an inverter 16 to control the operation of the motor generator 12, a motor generator current sensor 16A, attached to the inverter 16, as a motor generator current detection unit to detect an electric current inputted in the motor generator 12, a motor generator power sensor 16B, attached to the inverter 16, to detect electric power consumed in the motor generator 12, and a power storage device 17 to supply/receive electric power to from the motor generator 12 via the inverter 16.

The power storage device 17 has a capacitor 17A including a battery, a capacitor or the like, a capacitor current sensor 17B to measure an electric current flowing through the capacitor 17A, a capacitor voltage sensor 17C to measure the voltage of the capacitor 17A, and a capacitor temperature sensor 17D to measure the temperature of the capacitor 17A.

Further, the revolving superstructure 3 has a valve gear 18 to control the flow rate and directions of the pressure oil supplied to the hydraulic actuators 3A1, 4a to 4c, a pump capacity adjustment device 19 to adjust the capacity of the hydraulic pump 13, and a controller 20 to adjust the governor 11B to control the rotation speed NE of the engine 11, and control the inverter 16 to control output torque TM (see FIG. 6) of the motor generator 12.

The valve gear 18 forms a hydraulic circuit among the hydraulic pump 13, and the hydraulic actuators 3A1, 4a to 4c. Although not shown, the valve gear 18 has a spool to control the flow rate and direction of the pressure oil discharged from the hydraulic pump 13 with a stroke in an housing forming an outer shell, and an electromagnetic proportional valve to change the stroke amount of the spool in accordance with a command value of the controller 20.

The pump capacity adjustment device 19 controls the capacity (displacement capacity) of the hydraulic pump 13 based on a command signal outputted from the controller 20. More particularly, the pump capacity adjustment device 19 has a regulator 19A to tiltably support the swash plate of the hydraulic pump 13, and an electromagnetic proportional valve 19B to apply control pressure to the regulator 19A in accordance with a command value from the controller 20. When the regulator 19A receives the control pressure from the electromagnetic proportional valve 19B, it changes the tilted angle of the swash plate of the hydraulic pump 13 with this control pressure, to control the capacity (displacement capacity) of the hydraulic pump 13. Thus it is possible to control absorption torque of the hydraulic pump 13, i.e., load torque TP (see FIG. 7).

The controller 20 inputs a manipulation signal from the operating lever in the cab 5, and outputs a command signal corresponding to the operation amount of the operating lever to the electromagnetic proportional valve of the valve gear 18. Accordingly, when the operator in the cab 5 manipulates the operating lever, a command signal corresponding to the operation amount of the operating lever is inputted from the controller 20 into the electromagnetic proportional valve of the valve gear 18. Then the position of the spool of the valve gear 18 is changed, and pressure oil passed through the valve gear 18 from the hydraulic pump 13 is supplied to the hydraulic actuators 3A1 and 4a to 4c. With this operation, the hydraulic actuators 3A1 and 4a to 4c are driven with the pressure oil supplied from the hydraulic pump 13 via the valve gear 18.

Further, the controller 20 inputs information such as the rotation speed NE of the engine 11 detected with the engine rotation speed sensor 11A, boost pressure PT (see FIG. 12) of the engine 11 measured with the boost pressure sensor 11D, the rotation speed NM of the motor generator 12 detected with the motor generator rotation speed sensor 12A, the pressure measured with the discharge pressure sensor 13A, the flow rate measured with the discharge flow rate sensor 13B, the tilted angle measured with the tilted angle sensor, the electric current value inputted in the motor generator 12 detected with the motor generator current sensor 16A, the electric power consumed in the motor generator 12 detected with the motor generator power sensor 16B, the electric current flowing through the capacitor 17A measured with the capacitor current sensor 17B, the voltage of the capacitor 17A measured with the capacitor voltage sensor 17C, and the temperature of the capacitor 17A measured with the capacitor temperature sensor 17D.

The controller 20 calculates a power storage amount of the power storage device 17, based on the electric current flowing through the capacitor 17A measured with the capacitor current sensor 17B, the voltage of the capacitor 17A measured with the capacitor voltage sensor 17C, the temperature of the capacitor 17A measured with the capacitor temperature sensor 17D, and the like, thus manages the power storage amount of the power storage device 17.

Figure 3:
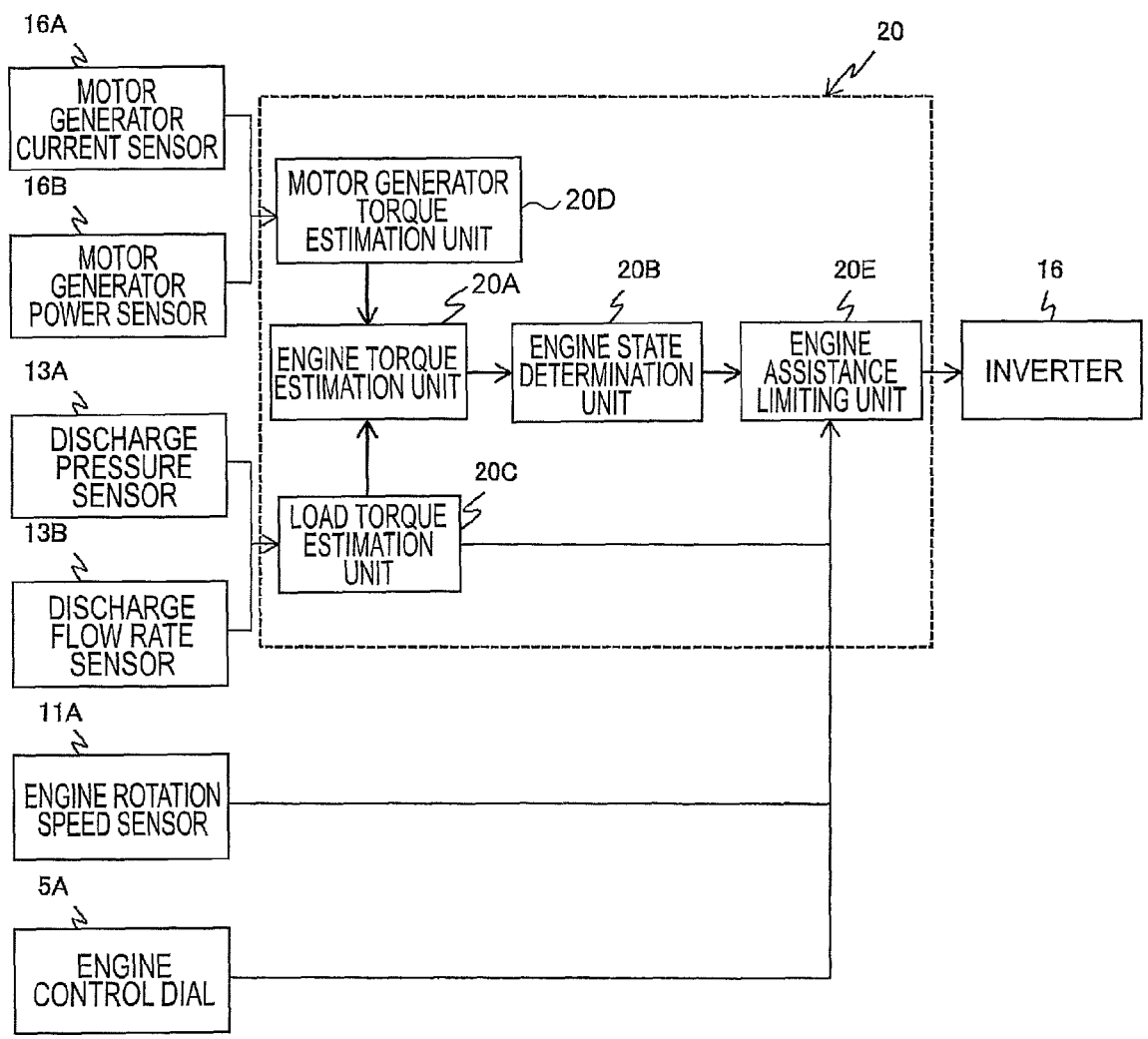
FIG. 3 is a block diagram showing a configuration of a controller shown in FIG. 2.

FIG. 3 is a functional block diagram showing a configuration of the controller 20 related to the control of the output torque TM of the motor generator 12.

As shown in FIG. 3, the controller 20 has e.g. an engine torque estimation unit 20A to estimate output torque TE (see FIG. 6) of the engine 11, an engine state determination unit 20B to determine the state of the output torque TE of the engine 11 based on the output torque TE of the engine 11 estimated with the engine torque estimation unit 20A, and a load torque estimation unit 20C to estimate load torque TP of the hydraulic pump 13. The load torque estimation unit 20C functions as a load torque detection unit to detect the load torque TP of the hydraulic pump 13.

Note that as shown in FIG. 2, in a motive power system where the engine 11, the motor generator 12, and the hydraulic pump 13 are mechanically connected, among the load torque TP of the hydraulic pump 13, the output torque TE of the engine 11, and the output torque TM of the motor generator 12, when the rotation speed NE of the engine 11 is constant, the following expression (1) is established.

[Expression 1]

$$TP = TE + TM \qquad (1)$$

The expression (1) is simplified as the following expression (2).

[Expression 2]

$$TE = TP - TM \qquad (2)$$

Accordingly, from the expression (2), it is possible to calculate the output torque TE of the engine 11 from the output torque TM of the motor generator 12 and the load torque TP of the hydraulic pump 13. The load torque TP of the hydraulic pump 13 is estimated with the load torque estimation unit 20C. It is necessary to obtain the output torque TM of the motor generator 12. In the first embodiment of the present invention, the controller 20 has a motor generator torque estimation unit 20D to estimate the output torque TM of the motor generator 12. The motor generator torque estimation unit 20D functions as a motor generator torque detection unit to detect the output torque TM of the motor generator 12.

Further, the motor generator torque estimation unit 20D calculates the output torque TM of the motor generator 12 from the electric power consumed in the motor generator 12 detected with e.g. the motor generator power sensor 16B. Further, it may be arranged such that the motor generator torque estimation unit 20D does not use the detection value from the motor generator power sensor 16B. For example, the motor generator torque estimation unit 20D is provided with a motor generator voltage detection unit (not shown) to detect the voltage of the inverter 16, and multiplies the electric current inputted in the motor generator 12 detected with the motor generator current sensor 16A by the voltage of the inverter 16 detected with the motor generator voltage sensor, to calculate the electric power consumed in the motor generator 12.

The load torque estimation unit 20C calculates the load torque TP of the hydraulic pump 13 based on the pressure measured with the discharge pressure sensor 13A and the flow rate measured with the discharge flow rate sensor 13B. Note that it may be arranged such that the controller 20 obtains the discharge flow rate of the hydraulic pump 13 without using the value measured with the discharge flow rate sensor 13B. For example, the controller 20 obtains the capacity of the hydraulic pump 13 from the tilted angle measured with the tilted angle sensor or a tilted angle estimated as described later, and calculates the discharge flow amount corresponding to the capacity. Further, it may be arranged such that the tilted angle of the swash plate of the hydraulic pump 13 is obtained without using the value measured with the tilted angle sensor. For example, the tilted angle of the hydraulic pump 13 is estimated from the operation amount of the operating lever, the command value to the pump capacity adjustment device 19, or the like.

Then the engine torque estimation unit 20A calculates the output torque TE of the engine 11 by substituting the load torque TP of the hydraulic pump 13 calculated with the load torque estimation unit 20C and the output torque TM of the motor generator 12 calculated with the motor generator torque estimation unit 20D into the above-described expression (2). The engine state determination unit 20B determines whether or not the output torque TE of the engine 11 calculated with the engine torque estimation unit 20A has become predetermined minimum torque Tmin (see FIG. 6).

The minimum torque Tmin is previously set as output torque corresponding to idling. Note that the minimum torque Tmin is not limited to this torque. It is desirable that the minimum torque Tmin is set as the output torque TE of the engine 11 in a status where the operating lever is not manipulated and charging/discharging to/from the motor generator 12 is not performed. Further, when the engine state determination unit 20B determines whether or not the engine 11 does not output torque, the minimum torque Tmin may be set to 0 Nm in place of the output torque corresponding to idling, but it may be desirably set to several tens Nm in consideration of estimation error.

Further, the controller 20 has an engine assistance limiting unit 20E to limit the motive-power assistance to the engine 11 with the motor generator 12 when the rotation speed NE of the engine 11 detected with the engine rotation speed sensor 11A is equal to or greater than a predetermined rotation speed N0 (see FIG. 6) and the engine state determination unit 20B determines that the output torque TE of the engine 11 has not become the minimum torque Tmin. The above-described rotation speed N0 is set to e.g. a rotation speed lower than the rotation speed corresponding to idling.

Figure 4A:
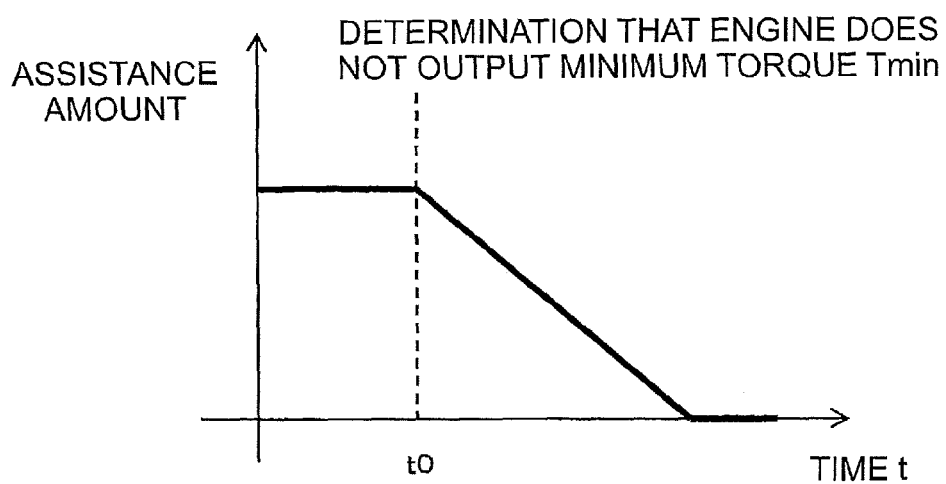
FIG. 4A is a graph of a limiting function of an engine assistance limiting unit shown in FIG. 3, showing temporal transition of assistance amount of a motor generator.

FIG. 4A shows an example of temporal transition of the amount of motive-power assistance with the motor generator 12 to the engine 11 (corresponding to an upper limit value of the output torque TM of the motor generator 12) before and after the motive-power assistance with the motor generator 12 to the engine 11 is limited with the engine assistance limiting unit 20E.

Note that, when the rotation speed NE of the engine 11 detected with the engine rotation speed sensor 11A is equal to or greater than the rotation speed N0 and engine state the determination unit 20B determines that the output torque TE of the engine 11 has not become the minimum torque Tmin, the hydraulic load is supported only with the output torque TM of the motor generator 12. In this case, e.g. as shown in FIG. 4A, the engine assistance limiting unit 20E reduces the amount of assistance with the motor generator 12 to the engine 11 as time t elapses.

Figure 4B:
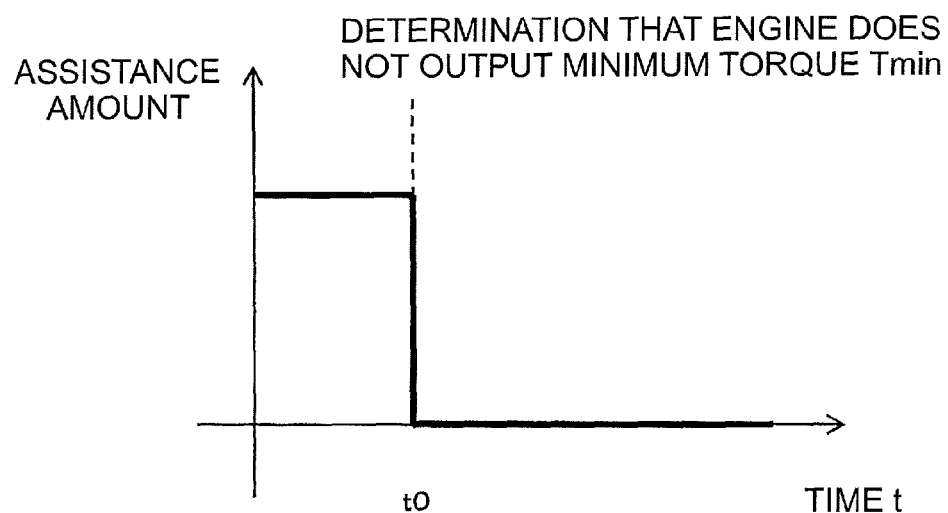
FIG. 4B is a graph of another example of the limiting function of the engine assistance limiting unit show in in FIG. 3, showing the temporal transition of the assistance amount of the motor generator.

With this arrangement, since it is possible to suppress unnecessary motive-power assistance with the motor generator 12 to the engine 11, it is possible to avoid occurrence of motoring in the engine 11 with the output torque TM of the motor generator 12, and to reduce the load on the engine 11 accompanying the motoring. Note that the limitation with the engine assistance limiting unit 20E is not limited to the above-described case. For example, as shown in FIG. 4B, at time t0 where the rotation speed NE of the engine 11 detected with the engine rotation speed sensor 11A is equal to or greater than the rotation speed N0 and the engine state determination unit 20B determines that the output torque TE of the engine 11 has not become the minimum torque Tmin, the motive-power assistance to the engine 11 with the motor generator 12 may be stopped.

On the other hand, when the rotation speed NE of the engine 11 detected with the engine rotation speed sensor 11A is less than the rotation speed N0 or the engine state determination unit 20B determines that the output torque TE of the engine 11 has become the minimum torque Tmin, the engine assistance limiting unit 20E does not limit the motive-power assistance with the motor generator 12 to the engine 11.

Figure 5A:
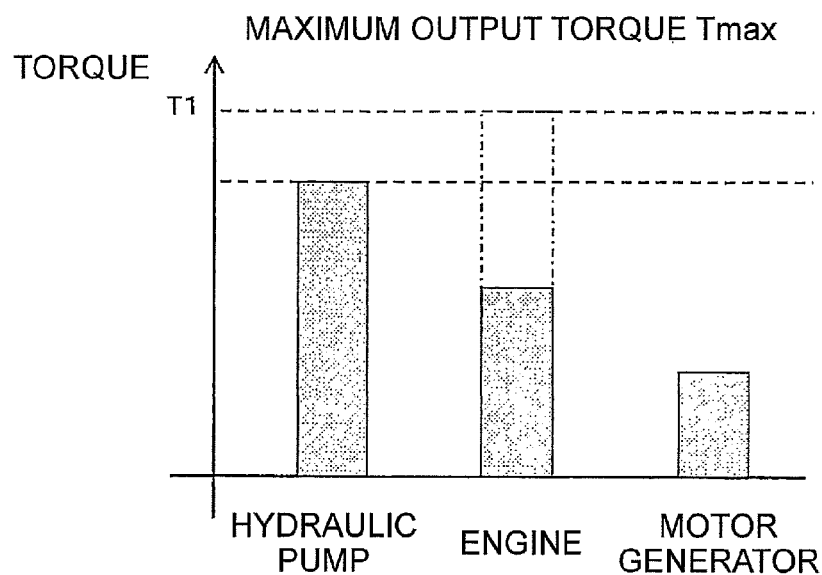
FIG. 5A is a graph showing relation among load torque of a hydraulic pump, output torque of an engine, and output torque of the motor generator, in a state where the engine assistance limiting unit shown in FIG. 3 does not limit the motive-power assistance with the motor generator to the engine.
Figure 5B:
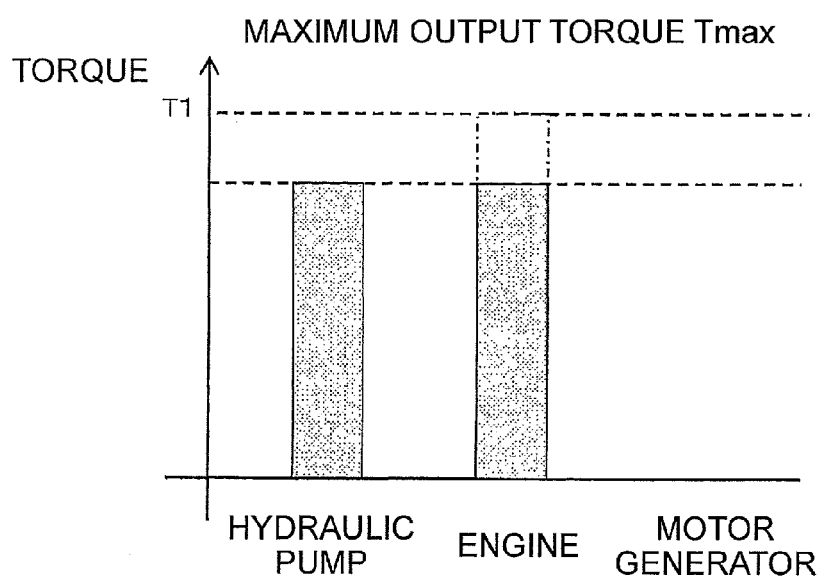
FIG. 5B is a graph showing relation among the load torque of the hydraulic pump, the output torque of the engine, and the output torque of the motor generator, in a state where the engine assistance limiting unit shown in FIG. 3 limits the motive-power assistance with the motor generator to the engine.

FIG. 5A shows the statuses of the respective output torque TE and TM of the engine 11 and the motor generator 12 with respect to the load torque TP of the hydraulic pump 13 when the engine assistance limiting unit 20E does not limit the motive-power assistance with the motor generator 12 to the engine 11. FIG. 5B shows the statuses of the respective output torque TE and TM of the engine 11 and the motor generator 12 with respect to the load torque TP of the hydraulic pump 13 when the engine assistance limiting unit 20E limits the motive-power assistance with the motor generator 12 to the engine 11.

As shown in FIG. 5A, in a case where the load torque TP of the hydraulic pump 13 is lower than the maximum output torque Tmax of the engine 11, when the motive-power assistance with the motor generator 12 to the engine 11 is not limited, the engine 11 and the motor generator 12 both support the load torque TP of the hydraulic pump 13, and the torque use rate of the engine 11 (the rate of actual output torque TE to the maximum output torque Tmax) is lowered. This corresponds to a situation where the engine 11 is left non-used while the electric power of the power storage device 17 is consumed even though the engine 11 has surplus power. Thus the entire work is operated with low energy efficiency.

Accordingly, in the first embodiment of the present invention, even when the rotation speed NE of the engine 11 detected with the engine rotation speed sensor 11A is less than the rotation speed E0 or the engine state determination unit 20B determines that the output torque TE of the engine 11 has become the minimum torque Tmin, the engine assistance limiting unit 20E limits the motive-power assistance with the motor generator 12 to the engine 11 when the load torque TP of the hydraulic pump 13 calculated with the load torque estimation unit 20C is lower than predetermined torque T1. The above-described torque T1 is e.g. greater than the minimum torque Tmin and equal to or less than the maximum output torque Tmax of the engine 11. It is desirable that the torque T1 is set to the maximum output torque Tmax of the engine 11.

With this arrangement, as shown in FIG. 5B, the load torque TP of the hydraulic pump 13 is supported only with the output torque TE of the engine 11. Accordingly, the torque use rate of the engine 11 is improved. Accordingly, it is possible to suppress unnecessary motive-power assistance to the engine 11 with the output torque TM of the motor generator 12. It is possible to reduce wasteful consumption of electric power accumulated in the power storage device 17, and prevent wasteful discharge from the power storage device 17, thus realize energy saving. Especially, as the life of the power storage device 17 is correlated to the charge/discharge amount, it is possible to achieve long life of the power storage device 17.

Further, even when the rotation speed NE of the engine 11 detected with the engine rotation speed sensor 11A is equal to or greater than the rotation speed E0 and the engine state determination unit 20B determines that the output torque TE of the engine 11 has become the minimum torque Tmin, or the load torque TP of the hydraulic pump 13 calculated with the load torque estimation unit 20C is equal to or greater than the torque T1, the engine assistance limiting unit 20E limits the motive-power assistance to the engine 11 with the motor generator 12 when the target rotation speed Wref of the engine 11 set with the engine control dial 5A is lower than the rotation speed NE of the engine 11 detected with the engine rotation speed sensor 11A.

With this arrangement, when over revolution occurs, as the motive-power assistance with the motor generator 12 is immediately limited with the engine assistance limiting unit 20E, it is possible to suppress promotion of the over revolution with the output torque TM of the motor generator 12. Accordingly, since it is possible to reduce damage to the engine 11 due to over revolution, it is possible to prevent fault of the engine 11.

Further, even when the load torque TP of the hydraulic pump 13 calculated with the load torque estimation unit 20C is lower than the torque T1, the engine assistance limiting unit 20E does not limit the motive-power assistance with the motor generator 12 to the engine 11 when the engine state determination unit 20B determines that the output torque TE of the engine 11 has not become the minimum torque Tmin and the target rotation speed Wref of the engine 11 detected with the engine control dial 5A is higher than the rotation speed NE of the engine 11 detected with the engine rotation speed sensor 11A, until the engine state determination unit 20B determines that the output torque TE of the engine 11 has become the minimum torque Tmin.

Figure 6:
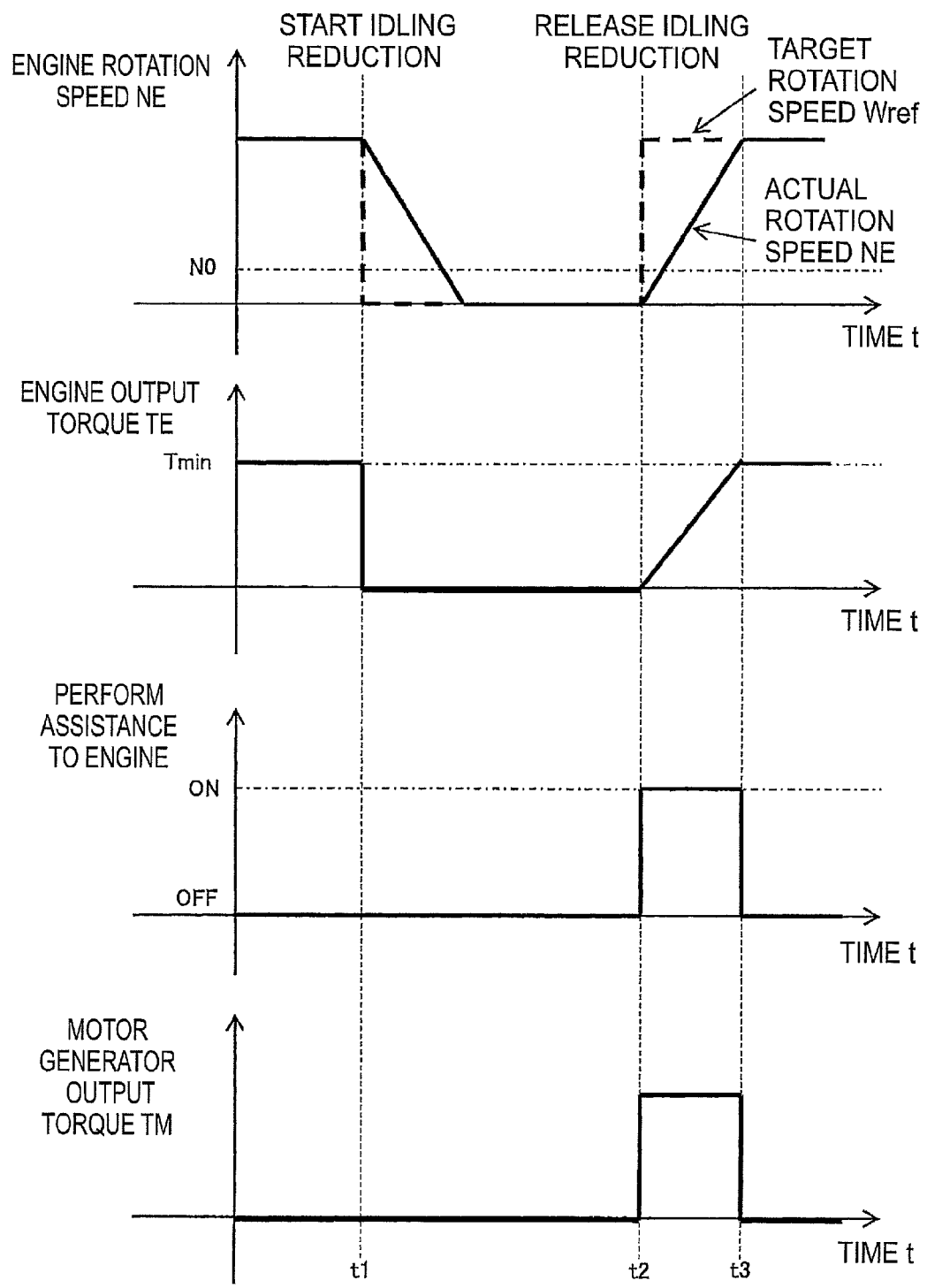
FIG. 6 is a timing chart showing the rotation speed of the engine, the output torque of the engine and execution of assistance to the engine upon idling reduction in the engine shown in FIG. 2, and the temporal transition of the output torque of the motor generator.

The contents of the limiting function of the engine assistance limiting unit 20E will be described in detail with reference to FIG. 6. FIG. 6 shows behaviors of the engine 11, the motor generator 12, and the engine assistance limiting unit 20E before and after the idling reduction in the engine 11. Note that in FIG. 6, the target rotation speed Wref of the engine 11 is represented with a broken line and the actual rotation speed NE, a solid line, and for assistance to explanation, to execute/not to execute the motive-power assistance with the motor generator 12 to the engine 11 is represented as ON/OFF state.

In FIG. 6, from the start to time t1, the engine 11 is in idling state. In this state, as the load torque TP of the hydraulic pump 13 is low, the engine 11 operates, to output torque corresponding to drive auxiliary machinery such as an air conditioner and the hydraulic pump 13. At this time, the output torque TE of the engine 11 is equal to or greater than the minimum torque Tmin. However, as the load torque TP of the hydraulic pump 13 is lower than the torque T1, the engine assistance limiting unit 20E limits the motive-power assistance with the motor generator 12 to the engine 11 (the execution of the assistance is in OFF state).

Next, when the idling reduction in the engine is started at time t1, the target rotation speed Wref of the engine 11 becomes 0 rpm, and the output torque TE of the engine 11 also becomes 0 Nm. With this arrangement, the actual rotation speed NE of the engine 11 is gradually lowered, then becomes 0 Nm several seconds later, and the engine 11 stops. At this time, the actual rotation speed NE of the engine 11 is less than the rotation speed N0. Since the load torque TP of the hydraulic pump 13 is lower than the torque T1, the engine assistance limiting unit 20E continuously limits the motive-power assistance with the motor generator 12 to the engine 11 (the execution of the assistance is in OFF state).

Next, when the idling reduction is released at time t2, the target rotation speed Wref of the engine 11 becomes the rotation speed corresponding to idling. At this point, the output torque TE of the engine 11 is 0 Nm and has not become the minimum torque Tmin. Since the target rotation speed Wref of the engine 11 is higher than the actual rotation speed NE (0 rpm), the engine assistance limiting unit 20E releases the limitation of the motive-power assistance with the motor generator 12 to the engine 11 (the execution of the assistance is in ON state). Accordingly, from time t2 to t3 where the deviation between the target rotation speed Wref of the engine 11 and the actual rotation speed NE remains, the motor generator 12 performs the motive-power assistance to the engine 11.

Next, when the target rotation speed Wref of the engine 11 and the actual rotation speed NE correspond with each other at time t3, the situation becomes the same as that at and before time t1. The engine assistance limiting unit 20E again limits the motive-power assistance with the motor generator 12 to the engine 11 (the execution of the assistance is in OFF state). With this arrangement, only the engine 11 outputs torque. In this manner, from the state of idling reduction where the engine 11 is completely stopped, it is possible to quickly start the engine 11 with the motor generator 12. Accordingly, it is possible to enable the operator in the cab 5 to quickly start the work.

Next, control operation of the controller 20 according to the first embodiment of the present invention will be described in detail based on the flowchart of FIG. 7.

First, the engine assistance limiting unit 20E inputs a detection signal from the engine rotation speed sensor 11A, and determines whether or not the rotation speed NE of the engine 11 detected with the engine rotation speed sensor 11A is equal to or greater than the rotation speed N0 ((step (hereinbelow, S)1). At this time, when the engine assistance limiting unit 20E determines that the rotation speed NE of the engine 11 detected with the engine rotation speed sensor 11A is less than the rotation speed N0 (S1/NO), the operation at procedure S1 is repeated.

On the other hand, when the engine assistance limiting unit 20E determines that the rotation speed NE of the engine 11 detected with the engine rotation speed sensor 11A is equal to or greater than the rotation speed N0 (S1/YES), the engine state determination unit 20B receives the result of calculation with the engine torque estimation unit 20A, and determines whether or not the output torque TE of the engine 11 has become the minimum torque Tmin (S2). At this time, when the engine state determination unit 20B determines that the output torque TE of the engine 11 has not become the minimum torque Tmin and transmits the determination result to the engine assistance limiting unit 20E (S2/YES), the engine assistance limiting unit 20E again inputs the detection signal from the engine rotation speed sensor 11A, and determines whether or not the rotation speed NE of the engine 11 detected with the engine rotation speed sensor 11A is equal to or greater than the rotation speed N0 (S3).

At procedure S3, when the engine assistance limiting unit 20E determines that the rotation speed NE of the engine 11 detected with the engine rotation speed sensor 11A is equal to or greater than the rotation speed N0 (S3/YES), the engine assistance limiting unit 20E outputs a command signal to limit the motive-power assistance with the motor generator 12 to the engine 11 to the inverter 16 (S4). Then the control operation of the controller 20 is terminated.

On the other hand, at procedure S3, when the engine assistance limiting unit 20E determines that the rotation speed NE of the engine 11 detected with the engine rotation speed sensor 11A is less than the rotation speed N0 (S3/NO), the engine assistance limiting unit 20E inputs an output signal from the engine control dial 5A and a detection signal from the engine rotation speed sensor 11A. Then the engine assistance limiting unit 20E determines that whether or not the target rotation speed Wref of the engine 11 set with the engine control dial 5A is higher than the rotation speed NE of the engine 11 detected with the engine rotation speed sensor 11A, i.e., whether or not the deviation between the target rotation speed Wref of the engine 11 and the actual rotation speed NE is greater than a threshold value $\Delta a$ (S5). With this arrangement, the determination of return to idling in the engine 11 is performed.

At procedure S5, when the engine assistance limiting unit 20E determines that the deviation between the target rotation speed Wref of the engine 11 and the actual rotation speed NE is greater than the threshold value $\Delta a$ (S5/YES), the engine assistance limiting unit 20E outputs a command signal to allow the motive-power assistance with the motor generator 12 to the engine 11 without limitation to the inverter 16 (S6). Then the control operation of the controller 20 is terminated.

On the other hand, at procedure S5, when the engine assistance limiting unit 20E determines that the deviation between the target rotation speed Wref of the engine 11 and the actual rotation speed NE is equal to or less than the threshold value $\Delta a$ (S5/NO), the engine assistance limiting unit 20E outputs a command signal not to perform the motive-power assistance with the motor generator 12 to the engine 11 but to stop motive-power assistance to the engine 11 to the inverter 16 (S7). Then the control operation of the controller 20 is terminated.

At procedure S2, when the engine state determination unit 20B determines that the output torque TE of the engine 11 has become the minimum torque Tmin and transmits the determination result to the engine assistance limiting unit 20E (S2/NO), the engine assistance limiting unit 20E inputs the output signal from the engine control dial 5A and the detection signal from the engine rotation speed sensor 11A. The engine assistance limiting unit 20E determines whether or not the target rotation speed Wref of the engine 11 set with the engine control dial 5A is lower than the rotation speed NE of the engine 11 detected with the engine rotation speed sensor 11A, i.e., whether or not the deviation between the target rotation speed Wref of the engine 11 and the actual rotation speed NE is less than a threshold value $\Delta b$ (S8). With this arrangement, the determination of over revolution of the engine 11 is performed.

At procedure S8, when the engine assistance limiting unit 20E determines that the deviation between the target rotation speed Wref of the engine 11 and the actual rotation speed NE is smaller than the threshold value $\Delta b$ (S8/YES), since over revolution has occurred, the operation at procedure S4 is performed, and the control operation of the controller 20 is terminated. On the other hand, at procedure S8, when the engine assistance limiting unit 20E determines that the deviation between the target rotation speed Wref of the engine 11 and the actual rotation speed NE is equal to or greater than the threshold value $\Delta b$ (S8/NO), since over revolution has not occur, the engine assistance limiting unit 20E receives the result of calculation with the load torque estimation unit 20C, and determines whether or not the load torque TP of the hydraulic pump 13 is lower than the torque T1 (S9).

At this time, when the engine assistance limiting unit 20E determines that the load torque TP of the hydraulic pump 13 is lower than the torque T1 (S9/YES), the operation at procedure S4 is performed, and the control operation of the controller 20 is terminated. On the other hand, at procedure S9, when the engine assistance limiting unit 20E determines that the load torque TP of the hydraulic pump 13 calculated with the load torque estimation unit 20C is equal to or greater than the torque T1 (S9/NO), the operation at procedure S6 is performed, and the control operation of the controller 20 is terminated. Note that the order of procedure S8 and procedure S9 may be inversed.

According to the first embodiment of the present invention having the above configuration, when it is determined that the rotation speed NE of the engine 11 detected with the engine rotation speed sensor 11A is equal to or greater than the rotation speed N0 and the engine state determination unit 20B determines that the output torque TE of the engine 11 has not become the minimum torque Tmin, or when the load torque TP of the hydraulic pump 13 detected with the the load torque estimation unit 20C is lower than the torque T1, the engine assistance limiting unit 20E limits the motive-power assistance with the motor generator 12 to the engine 11. It is possible to suppress unnecessary motive-power assistance to the engine 11 with the motor generator 12. With this arrangement, it is possible to avoid occurrence of motoring in the engine 11 with the output torque TM of the motor generator 12. Further, it is possible to ensure electric power for the power storage device 17 to realize energy saving, and achieve long life of the engine 11 and the power storage device 17.

Further, in the first embodiment of the present invention, the engine state determination unit 20B determines the state of the output torque TE of the engine 11 based on the load torque TP of the hydraulic pump 13 calculated with the load torque estimation unit 20C, the output torque TM of the motor generator 12 calculated with the motor generator torque estimation unit 20D, and the above-described expression (2), without directly detecting the output torque TE of the engine 11. Accordingly, it is possible to omit an actual torque detection unit to detect the actual torque TE actually outputted from the engine 11. With this arrangement, it is possible to realize the determination of the state of the output torque TE of the engine 11 with the engine state determination unit 20B with a simple configuration, and it is excellent in convenience.

Particularly, the information on the electric power consumed in the motor generator 12 and the electric current inputted in the motor generator 12, used in the calculation with the motor generator torque estimation unit 20D, is used with the inverter 16 or the like to control the operation of the motor generator 12. Accordingly, the motor generator power sensor 16B and the motor generator current sensor 16A to detect these information are generally mounted in the construction machine in advance. Further, the discharge pressure sensor 13A and the discharge flow rate sensor 13B used in the calculation with the load torque estimation unit 20C are previously mounted in the construction machine in many cases. Accordingly, since it is not necessary to newly add sensors to the machine, it is possible to achieve cost reduction.

Second Embodiment

Figure 8:
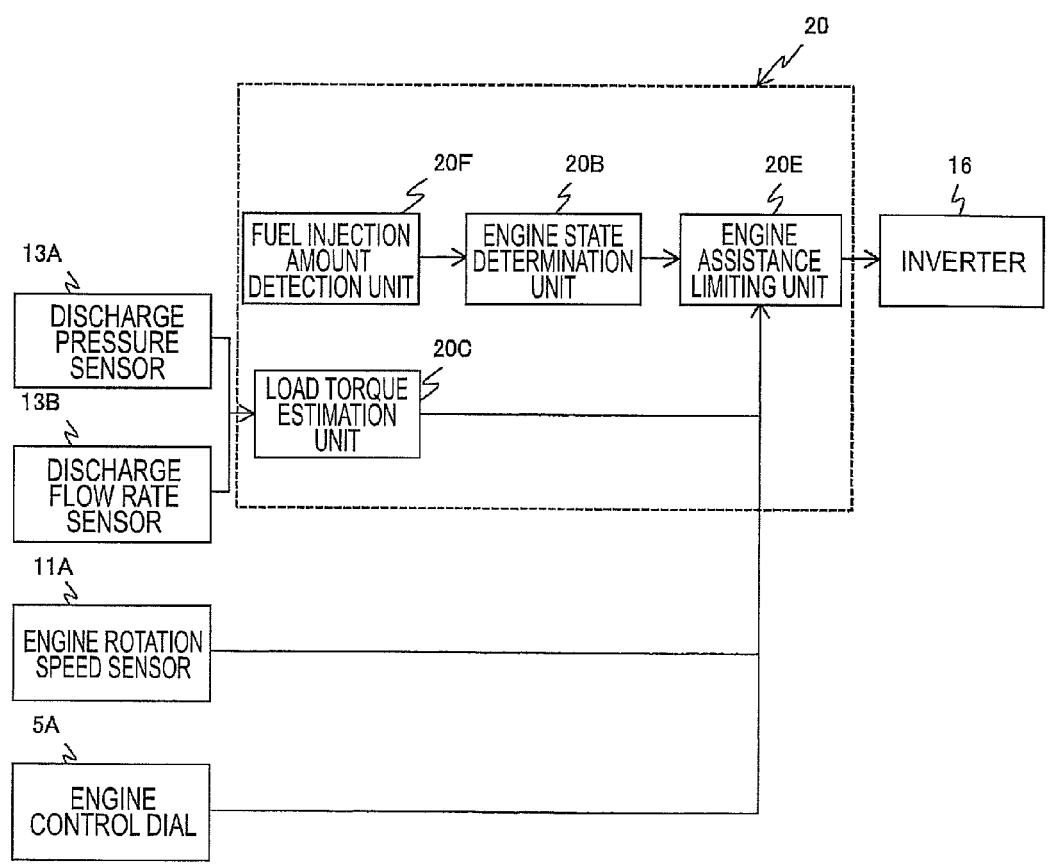
FIG. 8 is a block diagram showing a configuration of the controller according to a second embodiment of the present invention.

FIG. 8 is a functional block diagram showing a configuration of the controller 20 related to control of the output torque TM of the motor generator 12 in the hydraulic excavator 1 according to a second embodiment of the present invention. The elements being the same as or corresponding to those in the above-described first embodiment have the same reference numerals.

As shown in FIG. 8, the hydraulic excavator 1 according to the second embodiment of the present invention has a fuel injection amount detection unit 20F to detect a fuel injection amount of the engine 11, in place of the engine torque estimation unit 20A according to the first embodiment. The engine state determination unit 20B determines the state of the output torque TE of the engine 11 based on the fuel injection amount of the engine 11 detected with the fuel injection amount detection unit 20F. The fuel injection amount detection unit 20F calculates the fuel injection amount of the engine 11 from e.g. a command value outputted from the controller 20 to the governor 11B. Note that the fuel injection amount detection unit 20F is not limited to this configuration but may have a fuel injection amount sensor (not shown) to directly measure the fuel injection amount of the engine 11.

Figure 7:
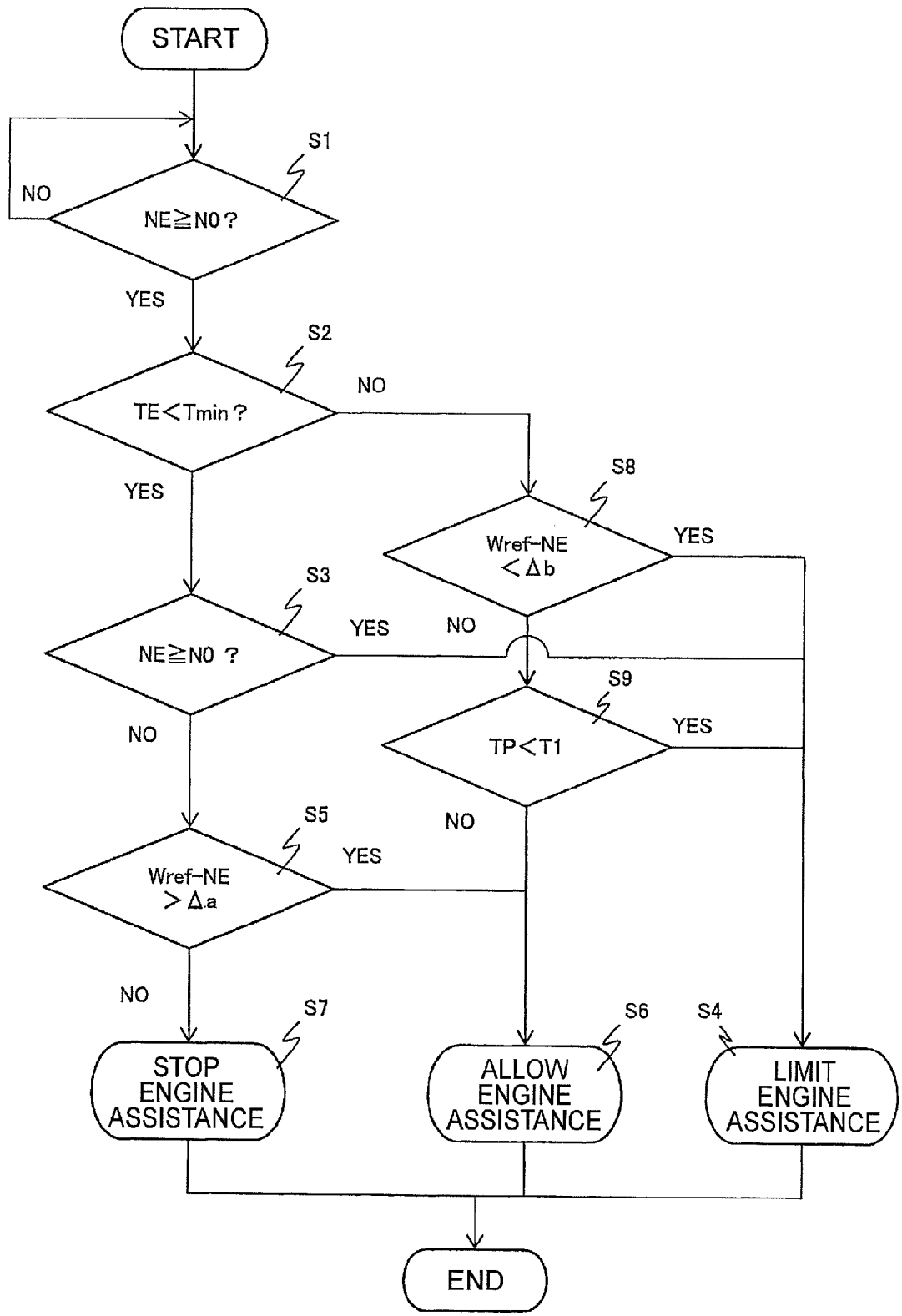
FIG. 7 is a flowchart showing the flow of operation of the controller shown in FIG. 2.

As shown at procedure S2 in FIG. 7, as long as the engine state determination unit 20B determines whether or not the output torque TE of the engine 11 is equal to or greater than the minimum torque Tmin, it is possible to limit the motive-power assistance with the motor generator 12 to the engine 11 with the engine assistance limiting unit 20E without using the engine torque estimation unit 20A according to the first embodiment. Note that as the output torque TE of the engine 11 is proportional to the fuel injection amount, it is possible to utilize the relation and the fuel injection amount of the engine 11 calculated with the fuel injection amount detection unit 20F for the determination with the engine state determination unit 20B.

In the second embodiment of the present invention, when the fuel injection amount of the engine 11 calculated with the fuel injection amount detection unit 20F is equal to or greater than an injection amount corresponding to the minimum torque Tmin, the engine state determination unit 20B determines that the output torque TE of the engine 11 has become the minimum torque Tmin. When the fuel injection amount of the engine 11 calculated with the fuel injection amount detection unit 20F is less than the injection amount corresponding to the minimum torque Tmin, the engine state determination unit 20B determines that the output torque TE of the engine 11 has not become the minimum torque Tmin. Other constituent elements of the second embodiment of the present invention are the same as those in the above-described first embodiment.

According to the second embodiment of the present invention having the above configuration, it is possible to obtain the same advantages as those obtained in the first embodiment. Further, the engine state determination unit 20B determines the state of the output torque TE of the engine 11 from the fuel injection amount of the engine 11 calculated with the fuel injection amount detection unit 20F without directly detecting the output torque TE of the engine 11. Accordingly, it is possible to omit an actual torque detection unit to detect the actual torque TE actually outputted from the engine 11. With this arrangement, it is possible to realize the determination of the state of the output torque TE of the engine 11 with the engine state determination unit 20B with a simple configuration, and it is excellent in convenience. Particularly, the fuel injection amount detection unit 20F is previously mounted in the construction machine in many cases. It is unnecessary to newly add sensors to the construction machine, and it is possible to achieve cost reduction.

Third Embodiment

Figure 9:
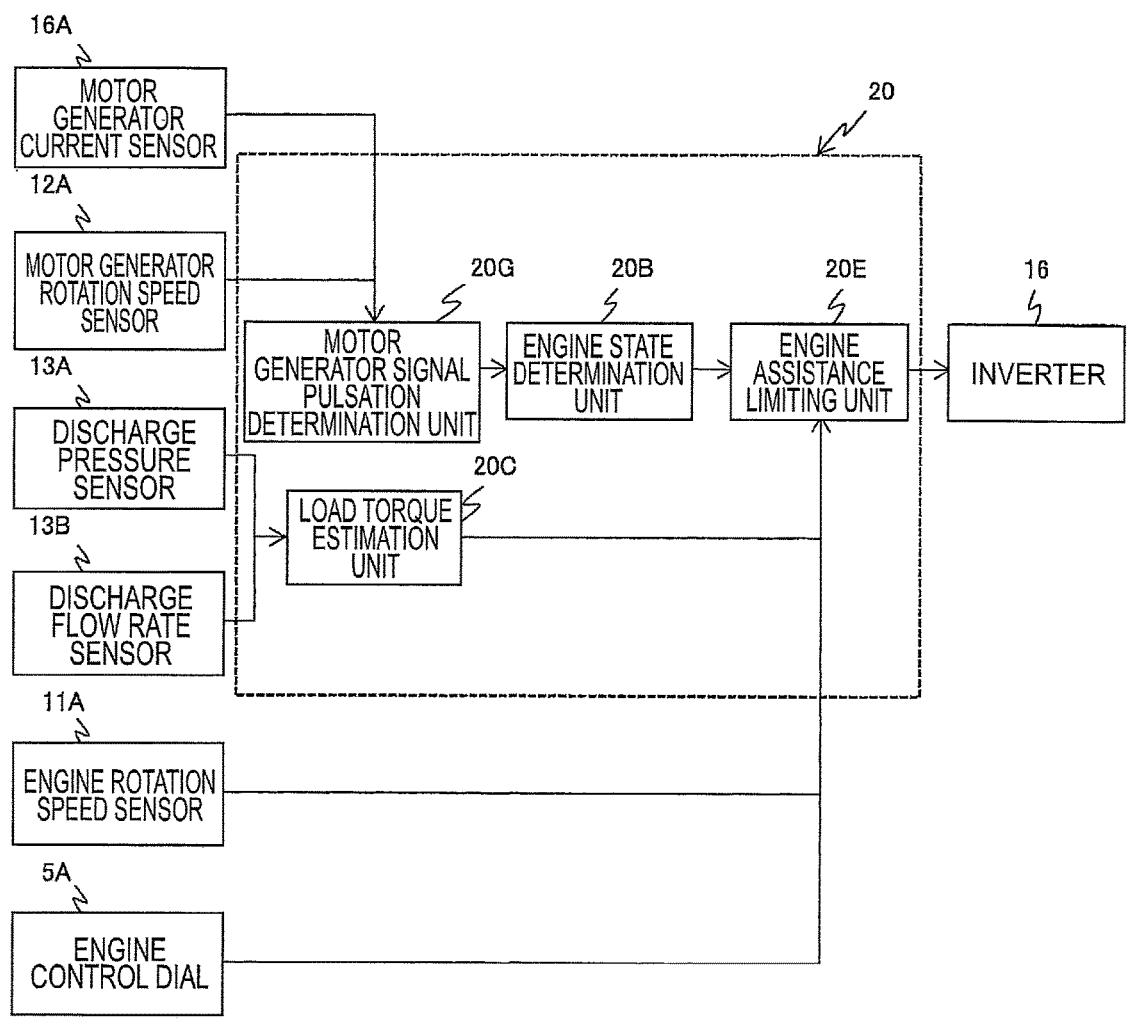
FIG. 9 is a block diagram showing a configuration of the controller according to a third embodiment of the present invention.

FIG. 9 is a functional block diagram showing a configuration of the controller 20 related to the control of the output torque TM of the motor generator 12 in the hydraulic excavator 1 according to a third embodiment of the present invention. The elements being the same as or corresponding to those in the above-described first embodiment have the same reference numerals.

The hydraulic excavator 1 according to the third embodiment of the present invention does not have the engine torque estimation unit 20A according to the first embodiment. As shown in FIG. 9, the engine state determination unit 20B determines the state of the output torque TE of the engine 11 based on e.g. the rotation speed NM of the motor generator 12 detected with the motor generator rotation speed sensor 12A and the electric current inputted in the motor generator 12 detected with the motor generator current sensor 16A.

Figure 10A:
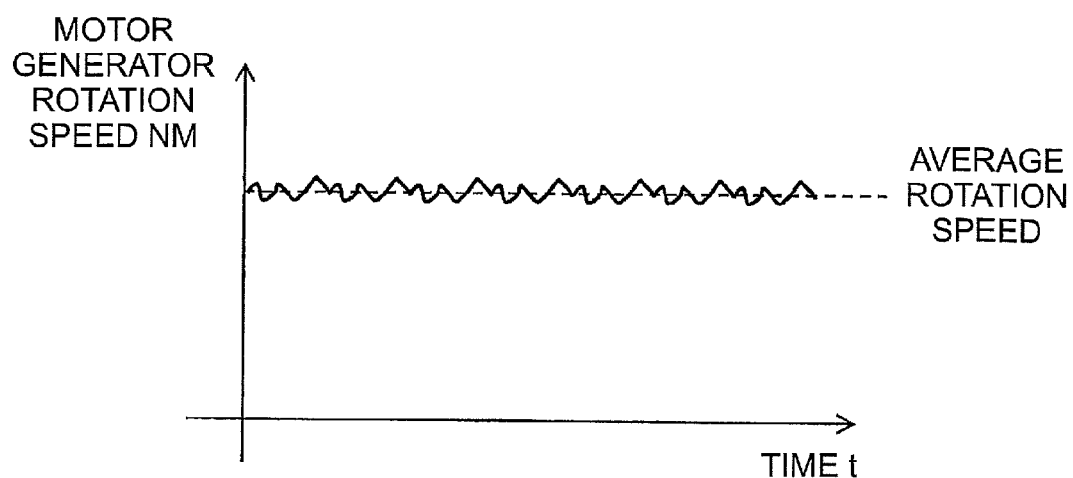
FIG. 10A is a graph showing the temporal transition of the rotation speed of the motor generator detected with a motor generator rotation speed sensor shown in FIG. 9, in a status where the output torque of the engine has not become predetermined minimum torque.
Figure 10B:
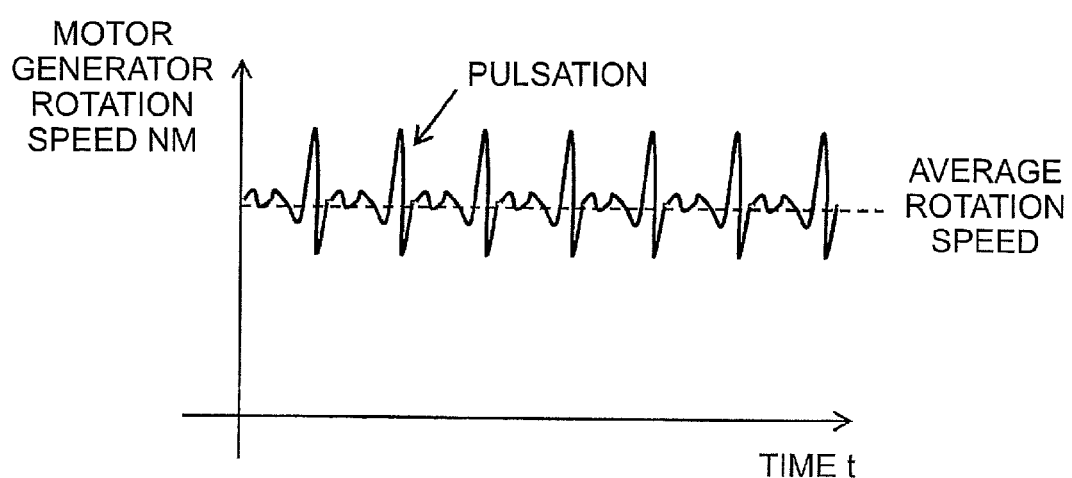
FIG. 10B is a graph showing the temporal transition of the rotation speed of the motor generator detected with the motor generator rotation speed sensor shown in FIG. 9, in a status where the output torque of the engine has become the predetermined minimum torque.

FIG. 10A and FIG. 10B are graphs showing pulsation included in the detection signal from the motor generator rotation speed sensor 12A accompanying explosion in a cylinder of the engine 11.

Although not shown, in the engine 11, explosion is caused with fuel in a cylinder to operate the piston, and via a crank mechanism connected to the piston, torque occurs on an output shaft of the engine 11. Accordingly, the torque actually outputted from the engine 11 has explosion torque including a explosion period. The motor generator 12 mechanically connected to the engine 11 is influenced by the explosion torque of the engine 11.

Generally, the motor generator 12 has a quick control period, and uses a measuring system having a quick sampling period. Accordingly, as shown in FIG. 10B, the influence of the explosion torque of the engine 11 is observable as pulsation of the detection signal from the motor generator rotation speed sensor 12A. Similarly, although not shown, the influence of the explosion torque of the engine 11 is observable as pulsation of the detection signal from the motor generator current sensor 16A.

As shown in FIG. 10A, these pulsations are not observed when the explosion torque of the engine 11 is small, i.e., the output torque TE of the engine 11 is small. Accordingly, it is possible to utilize the presence/absence of pulsation of the detection signals from the motor generator rotation speed sensor 12A and the motor generator current sensor 16A in the determination with the engine state determination unit 20B. Particularly, when the minimum torque Tmin in the determination with the engine state determination unit 20B is previously set to 0 Nm, it is possible to obtain high accuracy in the determination of the presence/absence of pulsation of the detection signals from the motor generator rotation speed sensor 12A and the motor generator current sensor 16A.

Accordingly, in the third embodiment of the present invention, the controller 20 has a motor generator signal pulsation determination unit 20G to determine the presence/absence of pulsation included in the respective detection signals from the motor generator rotation speed sensor 12A and the motor generator current sensor 16A. For example, when the rate of deviation of the respective detection values from the motor generator rotation speed sensor 12A and the motor generator current sensor 16A from moving average deviation is equal to or greater than a predetermined value, the motor generator signal pulsation determination unit 20G determines that the respective detection signals from the motor generator rotation speed sensor 12A and the motor generator current sensor 16A have pulsation. When the rate of deviation of the respective detection values from the motor generator rotation speed sensor 12A and the motor generator current sensor 16A from moving average deviation is less than the predetermined value, the motor generator signal pulsation determination unit 20G determines that the respective detection signals from the motor generator rotation speed sensor 12A and the motor generator current sensor 16A have no pulsation.

Then, when the motor generator signal pulsation determination unit 20G determines that the respective detection signals from the motor generator rotation speed sensor 12A and the motor generator current sensor 16A have pulsation, the engine state determination unit 20B determines that the output torque TE of the engine 11 has become the minimum torque Tmin. When the motor generator signal pulsation determination unit 20G determines that the respective detection signals from the motor generator rotation speed sensor 12A and the motor generator current sensor 16A have no pulsation, the engine state determination unit 20B determines that the output torque TE of the engine 11 has not become the minimum torque Tmin. Other constituent elements of the third embodiment of the present invention are the same as those in the above-described first embodiment.

According to the third embodiment of the present invention having the above configuration, the same advantages as those in the first embodiment are obtained, and in addition, the engine state determination unit 20B determines the state of the output torque TE of the engine 11 from the result of determination of pulsation of the detection signals from the motor generator rotation speed sensor 12A and the motor generator current sensor 16A with the motor generator signal pulsation determination unit 20G, without directly detecting the output torque TE of the engine 11. Accordingly, it is possible to omit an actual torque detection unit to detect the actual torque TE actually outputted from the engine 11. With this arrangement, it is possible to realize the determination of the state of the output torque TE of the engine 11 with the engine state determination unit 20B with a simple configuration, and it is excellent in convenience.

Particularly, the information on the rotation speed NM of the motor generator 12 and the electric current inputted in the motor generator 12 is used for the inverter 16 or the like to control the operation of the motor generator 12. Accordingly, the motor generator rotation speed sensor 12A and the motor generator current sensor 16A to detect these information are generally mounted in the construction machine in advance. Accordingly, since it is not necessary to newly add sensors to the machine, it is possible to achieve cost reduction.

Note that the explosion torque of the engine 11 depends on the combustion cycle of the engine 11. The combustion cycle depends on the rotation speed NE of the engine 11. That is, the pulsation observed in the various signals related to the motor generator 12 varies in accordance with the rotation speed NE of the engine 11. Accordingly, it is possible to improve the accuracy of the determination of the presence/absence of pulsation by previously storing the information on the variation of the various signals related to the motor generator 12 with respect to the rotation speed NE of the engine 11 into a memory (not shown) of the controller 20, and comparing the observed pulsation of the respective detection signals from the motor generator rotation speed sensor 12A and the motor generator current sensor 16A with the information stored in the memory, with the motor generator signal pulsation determination unit 20.

Further, in the third embodiment of the present invention, the engine state determination unit 20B determines the state of the output torque TE of the engine 11 based on the rotation speed NM of the motor generator 12 detected with the motor generator rotation speed sensor 12A, and the electric current inputted in the motor generator 12 detected with the motor generator current sensor 16A, however, the determination is not limited to this arrangement. It may be arranged such that the engine state determination unit 20B determines the state of the output torque TE of the engine 11 based on one of the rotation speed NM of the motor generator 12 detected with the motor generator rotation speed sensor 12A and the electric current inputted in the motor generator 12 detected with the motor generator current sensor 16A.

Fourth Embodiment

Figure 11:
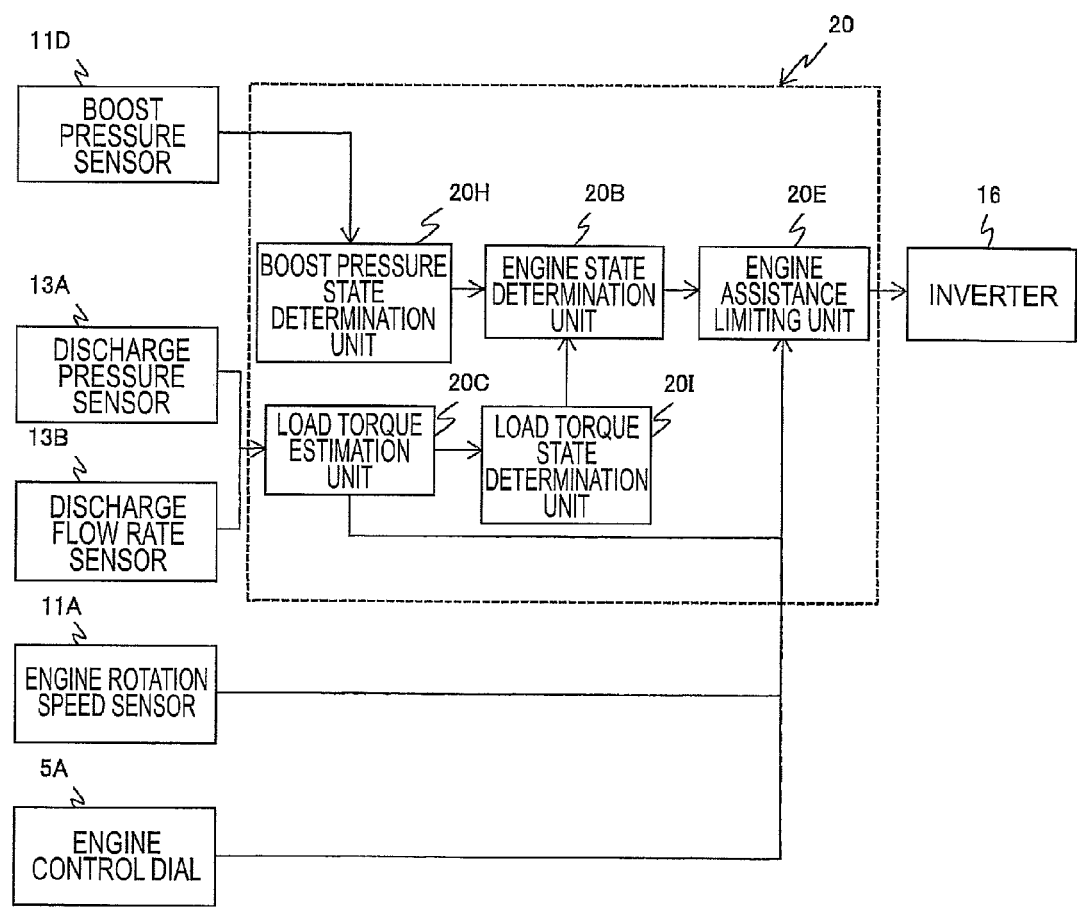
FIG. 11 is a block diagram showing a configuration of the controller according to a fourth embodiment of the present invention.

FIG. 11 is a functional block diagram showing a configuration of the controller 20 related to control of the output torque TM of the motor generator 12 in the hydraulic excavator 1 according to a fourth embodiment of the present invention. The elements being the same as or corresponding to those in the above-described first embodiment have the same reference numerals.

The hydraulic excavator 1 according to the fourth embodiment of the present invention does not have the engine torque estimation unit 20A according to the first embodiment. For example, as shown in FIG. 11, the engine state determination unit 20B determines the state of the output torque TE of the engine 11 based on the load torque TP of the hydraulic pump 13 detected with the load torque estimation unit 20C and the boost pressure PT of the engine 11 detected with the boost pressure sensor 11D.

The supercharger 11C compresses air forced into the engine 11 by utilizing exhaust gas, to improve combustion efficiency of the fuel in the cylinder chamber. Accordingly, the supercharging to the engine 11 means fuel combustion in the engine 11, i.e., the engine 11 outputs torque.

Figure 12:
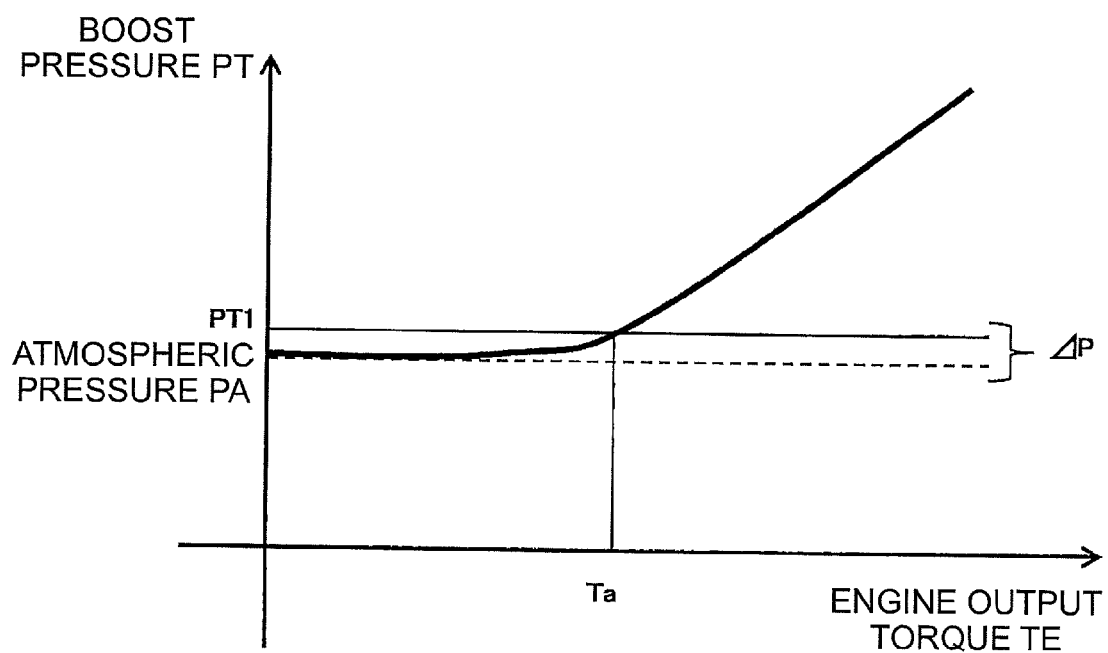
FIG. 12 is a graph showing relation between boost pressure of the engine shown in FIG. 2 and the output torque of the engine.

FIG. 12 schematically shows the relation between the boost pressure PT of the engine 11 and the output torque TE of the engine 11.

As shown in FIG. 12, the difference between the boost pressure PT of the engine 11 and atmospheric pressure PA is increased in accordance with increase in the output torque TE of the engine 11. When the output torque TE of the engine 11 is low, there is slight difference between the boost pressure PT and the atmospheric pressure PA. Accordingly, when the difference between the boost pressure PT and the atmospheric pressure PA is equal to or less than a threshold value $\Delta P$, i.e., when the output torque TE of the engine 11 is equal to or less than output torque Ta corresponding to the boost pressure PT1 equal to the sum between the atmospheric pressure PA and the threshold value $\Delta P$, it is difficult to determine whether or not the engine 11 outputs torque, and it is difficult to perform the determination with the engine assistance limiting unit 20E.

On the other hand, in a status where the boost pressure PT of the engine 11 is low and idling occurs in the engine 11, when the assistance to the output torque TE of the engine 11 is limited, since the motor generator 12 cannot perform assistance to the output torque TE of the engine 11 upon abrupt imposition of load torque TP on the hydraulic pump 13, engine stall might occur.

Then, in the fourth embodiment of the present invention, in the determination with the engine state determination unit 20B, in addition to the boost pressure PT measured with the boost pressure sensor 11D, the load torque TP of the hydraulic pump 13 calculated with the load torque estimation unit 20C is also used. More particularly, the controller 20 has a boost pressure state determination unit 20H to determine the state of the boost pressure PT of the engine 11 in accordance with the boost pressure PT of the engine 11 measured with the boost pressure sensor 11D and a load torque state determination unit 20I to determine the state of the load torque TP of the hydraulic pump 13 in accordance with the load torque TP of the hydraulic pump 13 calculated with the load torque estimation unit 20C.

For example, when the boost pressure PT of the engine 11 measured with the boost pressure sensor 11D is equal to or greater than a predetermined value Ph (see FIG. 14), the boost pressure state determination unit 20H determines that the boost pressure PT of the engine 11 is high. When the boost pressure PT of the engine 11 measured with the boost pressure sensor 11D is less than the predetermined value Ph, the boost pressure state determination unit 20H determines that the boost pressure PT of the engine 11 is low. For example, when the load torque TP of the hydraulic pump 13 calculated with the load torque estimation unit 20C is equal to or greater than a predetermined value Th (see FIG. 14), the load torque state determination unit 20I determines that the load torque TP of the hydraulic pump 13 is high. When the load torque TP of the hydraulic pump 13 calculated with the load torque estimation unit 20C is less than the predetermined value Th, the load torque state determination unit 20I determines that the load torque TP of the hydraulic pump 13 is low. Note that the predetermined value Ph may be set to e.g. a sum PT1 between the atmospheric pressure PA and the threshold value $\Delta P$, or may be set to a value 1.5 times of the atmospheric pressure PA. Further, the predetermined value Th is set to a value greater than the torque T1.

FIG. 13 is a matrix diagram showing the operation state of the hydraulic excavator 1 in the respective states of the boost pressure PT of the engine 11 and the load torque TP of the hydraulic pump 13.

As shown in FIG. 13, when the boost pressure state determination unit 20H determines that the boost pressure PT of the engine 11 is low and the load torque state determination unit 20I determines that the load torque TP of the hydraulic pump 13 is low, it is possible to determine that, as the operation state of the hydraulic excavator 1, the engine 11 is in idling state. At this time, the engine state determination unit 20B determines that the output torque TE of the engine 11 has become the minimum torque Tmin. Accordingly, the engine assistance limiting unit 20E allows the motive-power assistance with the motor generator 12 to the engine 11 without limitation.

Note that in the status where the engine 11 is in the idling state, even though the engine assistance limiting unit 20E allows the motive-power assistance with the motor generator 12 to the engine 11, when the load torque TP less than the torque T1 is calculated with the load torque estimation unit 20C, the engine assistance limiting unit 20E limits the motive-power assistance with the motor generator 12 to the engine 11. Accordingly, it is possible to suppress unnecessary motive-power assistance to the engine with the motor generator 12 when the engine 11 is in the idling state.

On the other hand, when the boost pressure state determination unit 20H determines that the boost pressure PT of the engine 11 is high and the load torque state determination unit 20I determines that the load torque TP of the hydraulic pump 13 is high, it is possible to determine that, as the operation state of the hydraulic excavator 1, heavy-load work is being performed. At this time, when the engine assistance limiting unit 20E limits the motive-power assistance with the motor generator 12 to the engine 11, engine stall might occur. Accordingly, the engine state determination unit 20B determines that the output torque TE of the engine 11 has become the minimum torque Tmin, and the engine assistance limiting unit 20E allows the motive-power assistance with the motor generator 12 to the engine 11 without limitation.

Further, when the boost pressure state determination unit 20H determines that the boost pressure PT of the engine 11 is high and the load torque state determination unit 20I determines that the load torque TP of the hydraulic pump 13 is low, as the engine 11 outputs torque in the status where the load torque TP of the hydraulic pump 13 is low, it is possible to determine that, as the operation state of the hydraulic excavator 1, the power generation is being performed. At this time, as the engine state determination unit 20B determines that the output torque TE of the engine 11 has become the minimum torque Tmin, the engine assistance limiting unit 20E allows the motive-power assistance with the motor generator 12 to the engine 11 without limitation.

Further, when the boost pressure state determination unit 20H determines that the boost pressure PT of the engine 11 is low and the load torque state determination unit 20I determines that the load torque TP of the hydraulic pump 13 is high, as the engine 11 does not output torque although the load torque TP of the hydraulic pump 13 is low, it is possible to determine that, as the operation state of the hydraulic excavator 1, the excessive assistance to the engine 11 is performed with the motor generator 12. At this time, the engine state determination unit 20B determines that the output torque TE of the engine 11 has not become the minimum torque Tmin, and the engine assistance limiting unit 20E limits the motive-power assistance with the motor generator 12 to the engine 11. Other constituent elements of the fourth embodiment of the present invention are the same as those in the above-described first embodiment.

Figure 14:
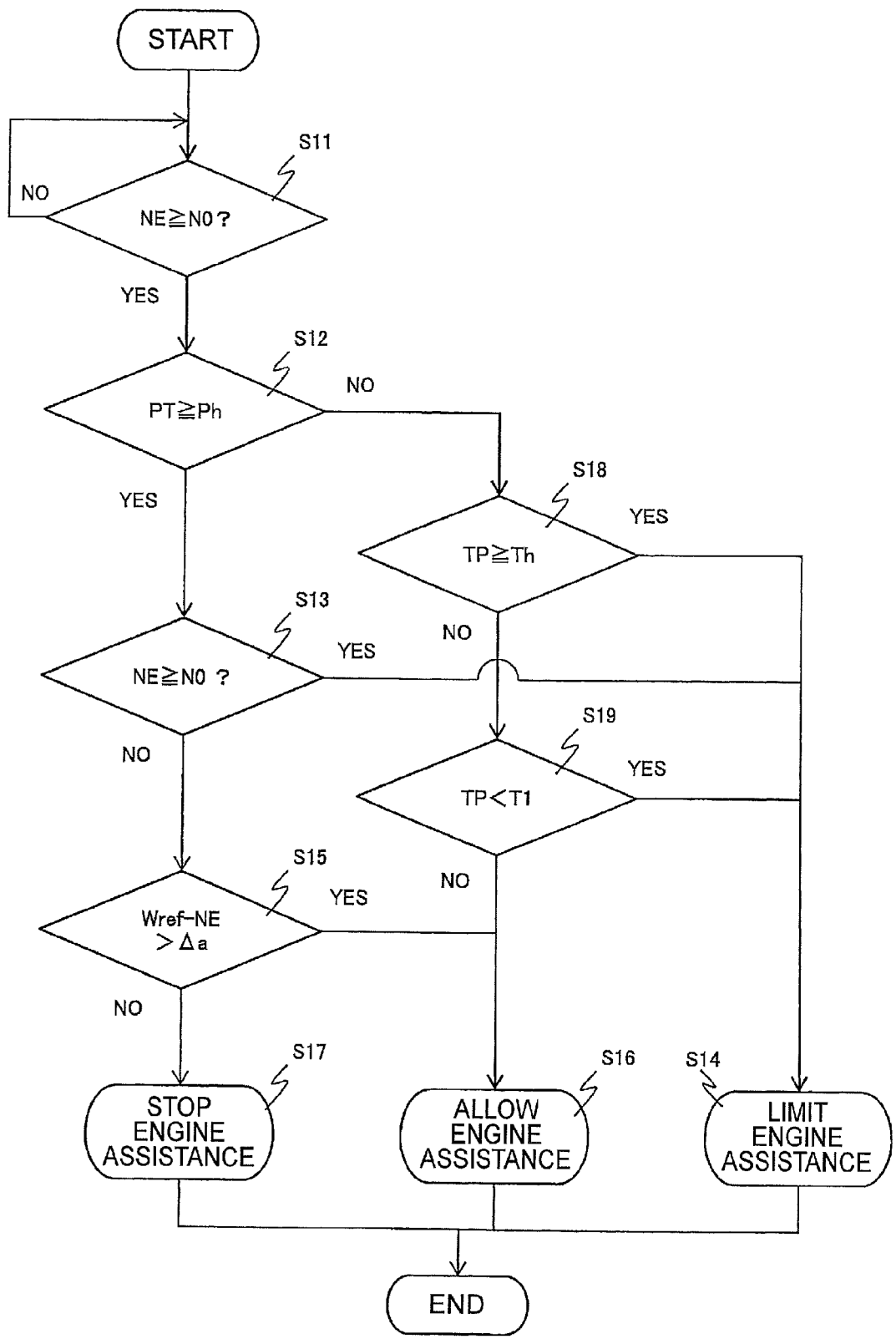
FIG. 14 is a flowchart showing the flow of operation of the controller shown in FIG. 11.

Next, the control operation of the controller 20 according to the fourth embodiment of the present invention will be described in detail based on the flowchart of FIG. 14.

First, the engine assistance limiting unit 20E inputs the detection signal from the engine rotation speed sensor 11A, and determines whether or not the rotation speed NE of the engine 11 detected with the engine rotation speed sensor 11A is equal to or greater than the rotation speed N0 (S11). At this time, when the engine assistance limiting unit 20E determines that the rotation speed NE of the engine 11 detected with the engine rotation speed sensor 11A is less than the rotation speed N0 (S11/NO), the operation at procedure S1 is repeated.

On the other hand, when the engine assistance limiting unit 20E determines that the rotation speed NE of the engine 11 detected with the engine rotation speed sensor 11A is equal to or greater than the rotation speed N0 (S11/YES), the boost pressure state determination unit 20H receives the result of measurement from the boost pressure sensor 11D, and determines whether or not the boost pressure PT of the engine 11 is high (S12). At this time, when the boost pressure state determination unit 20H determines that the boost pressure PT of the engine 11 is high and transmits the determination result to the engine assistance limiting unit 20E (S12/YES), the engine assistance limiting unit 20E again inputs the detection signal from the engine rotation speed sensor 11A, and determines whether or not the rotation speed NE of the engine 11 detected with the engine rotation speed sensor 11A is equal to or greater than the rotation speed N0 (S13).

At procedure S13, when the engine assistance limiting unit 20E determines that the rotation speed NE of the engine 11 detected with the engine rotation speed sensor 11A is equal to or greater than the rotation speed N0 (S13/YES), the engine assistance limiting unit 20E outputs a command signal to limit the motive-power assistance with the motor generator 12 to the engine 11 to the inverter 16 (S14). Then the control operation of the controller 20 is terminated.

On the other hand, at procedure S13, when the engine assistance limiting unit 20E determines that the rotation speed NE of the engine 11 detected with the engine rotation speed sensor 11A is less than the rotation speed N0 (S13/NO), the engine assistance limiting unit 20E inputs an output signal from the engine control dial 5 and the detection signal from the engine rotation speed sensor 11A, and determines whether or not the target rotation speed Wref of the engine 11 set with the engine control dial 5A is higher than the rotation speed NE of the engine 11 detected with the engine rotation speed sensor 11A, i.e., whether or not the deviation between the target rotation speed Wref of the engine 11 and the actual rotation speed NE is greater than the threshold value Δa (S15). With this arrangement, the determination of return to idling in the engine 11 is performed.

At procedure S15, when the engine assistance limiting unit 20E determines that the deviation between the target rotation speed Wref of the engine 11 and the actual rotation speed NE is greater than the threshold value Δa (S15/YES), the engine assistance limiting unit 20E outputs a command signal to allow the motive-power assistance with the motor generator 12 to the engine 11 without limitation to the inverter 16 (S16). Then the control operation of the controller 20 is terminated.

On the other hand, at procedure S15, when the engine assistance limiting unit 20E determines that the deviation between the target rotation speed Wref of the engine 11 and the actual rotation speed NE is equal to or less than the threshold value Δa (S15/NO), the engine assistance limiting unit 20E outputs a command signal not to perform the motive-power assistance with the motor generator 12 to the engine 11 but to stop the motive-power assistance to the engine 11 to the inverter 16 (S17). Then the control operation of the controller 20 is terminated.

At procedure S12, when the boost pressure state determination unit 20H determines that the boost pressure PT of the engine 11 is low and transmits the determination result to the engine assistance limiting unit 20E (S12/NO), the load torque state determination unit 20I receives the calculation result from the load torque estimation unit 20C, and determines whether or not the load torque TP of the hydraulic pump 13 is high (S18). At this time, when the load torque estimation unit 20C determines that the load torque TP of the hydraulic pump 13 is high, and transmits the determination result to the engine assistance limiting unit 20E (S18/YES), the operation at procedures S14 is performed. Then the control operation of the controller 20 is terminated.

On the other hand, at procedure S18, when the load torque state determination unit 20I determines that the load torque TP of the hydraulic pump 13 is low, and transmits the determination result to the engine assistance limiting unit 20E (S18/NO), the engine assistance limiting unit 20E receives the calculation result from the load torque estimation unit 20C, and determines whether or not the load torque TP of the hydraulic pump 13 is lower than the torque T1 (S19).

At this time, when the engine assistance limiting unit 20E determines that the load torque TP of the hydraulic pump 13 is lower than the torque T1 (S19/YES), the operation at procedure S14 is performed. Then the control operation of the controller 20 is terminated. On the other hand, at procedure S19, when the engine assistance limiting unit 20E determines that the load torque TP of the hydraulic pump 13 is equal to or greater than the torque T1 (S19/NO), the operation at procedure S16 is performed. Then the control operation of the controller 20 is terminated.

According to the fourth embodiment of the present invention having the above configuration, it is possible to obtain the same advantages as those obtained in the first embodiment. Further, the engine state determination unit 20B determines the state of the output torque TE of the engine 11 in accordance with the operation state of the hydraulic excavator 1, determined from the combination of the result of determination of the state of the boost pressure PT of the engine 11 with the boost pressure state determination unit 20H and the result of determination of the state of the load torque TP of the hydraulic pump 13 with the load torque state determination unit 20I, without directly detecting the output torque TE of the engine 11. Accordingly, it is possible to omit an actual torque detection unit to detect the actual torque TE actually outputted from the engine 11. With this arrangement, it is possible to realize the determination of the state of the output torque TE of the engine 11 with the engine state determination unit 20B with a simple configuration, and it is excellent in convenience.

Particularly, the boost pressure sensor 11D used in the determination with the boost pressure state determination unit 20H is previously provided in the construction machine in many cases. It is not necessary to newly add a sensor and it is possible to achieve cost reduction. Note that in the fourth embodiment of the present invention, as shown in FIG. 13, it is possible to determine the operation state of the hydraulic excavator 1 based on determination with the load torque state determination unit 20I as to whether the load torque TP of the hydraulic pump 13 is high or low. Accordingly, in the fourth embodiment of the present invention, when applied to a system having plural hydraulic pumps, the engine state determination unit 20B sufficiently determines the state of the output torque TE of the engine 11, even though the load torque TP is not accurately calculated due to fault or the like in one of the hydraulic pumps.

Note that the above-described present embodiment has been described in detail for clearly explaining the present invention, but is not necessarily limited to a configuration having all the described constituent elements. Further, it is possible to replace a part of the constituent elements of an embodiment with the constituent elements of another embodiment. Further, it is possible to add the constituent elements of an embodiment to the constituent elements of another embodiment.

Figure 15:
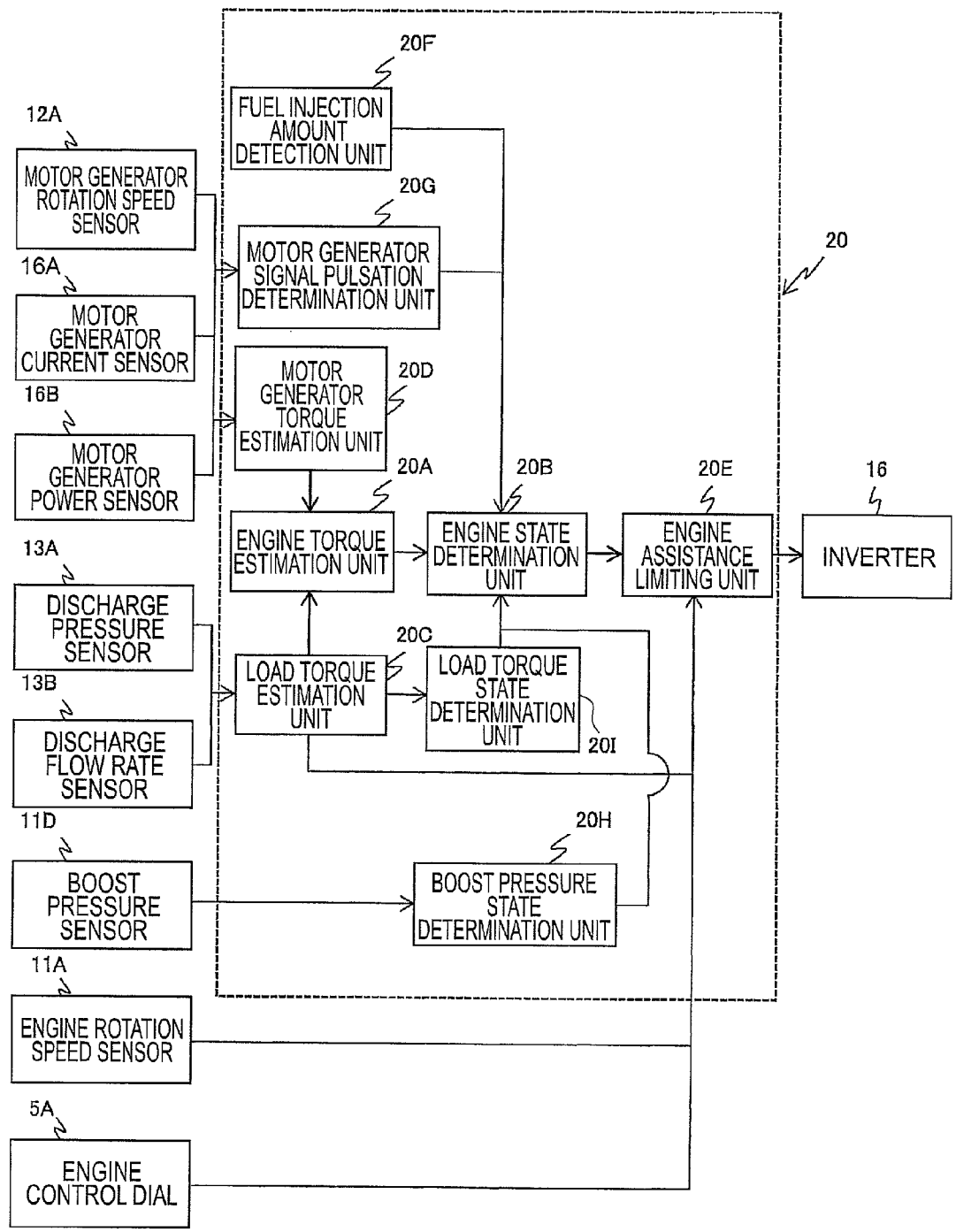
FIG. 15 is a block diagram showing a configuration of the controller according to a combination of the first to fourth embodiments of the present invention.

Accordingly, for example, as shown in FIG. 15, the determination of the state of the output torque TE of the engine 11 with the engine state determination unit 20B may be performed by using the configurations of the first to fourth embodiments of the present invention simultaneously. With this arrangement, since it is possible to realize the determination of the state of the output torque TE of the engine 11 with the engine state determination unit 20B by using the different functions of the respective embodiments, even when abnormality occurs in a part of the various sensors according to the respective embodiments, the engine assistance limiting unit 20E sufficiently limits the assistance with the motor generator 12 to the output torque TE of the engine 11. With this arrangement, it is possible to provide a highly-reliable hydraulic excavator 1.

Further, the hybrid construction machine according to the respective embodiments has the hybrid hydraulic excavator 1, however, the hybrid construction machine is not limited to this arrangement, but it may be a construction machine such as a hybrid wheel loader.

What is claimed is:

1. A hybrid construction machine comprising:
an engine;
a hydraulic pump driven with the engine;
a hydraulic working unit driven with pressure oil discharged from the hydraulic pump;
a motor generator that transmits torque to the engine, and performs motive-power assistance to the engine and power generation;
a power storage device that supplies/receives electric power to/from the motor generator;
an engine rotation speed detection unit that detects a rotation speed of the engine;
an engine state determination unit that determines a state of output torque of the engine;
a load torque detection unit that detects load torque of the hydraulic pump; and
an engine assistance limiting unit that, when the rotation speed of the engine detected with the engine rotation speed detection unit is equal to or greater than a predetermined rotation speed which is set to a rotation speed lower than a rotation speed during idling, and the engine state determination unit determines that the output torque of the engine has not become a predetermined minimum torque which is set as an output torque during idling, limits the motive-power assistance with the motor generator to the engine, and, when the load torque of the hydraulic pump detected with the load torque detection unit is lower than a predetermined torque which is set to a maximum output torque of the engine, limits the motive-power assistance with the motor generator to the engine.

2. The hybrid construction machine according to claim 1, further comprising:
a fuel injection amount detection unit that detects a fuel injection amount of the engine,
wherein the engine state determination unit determines the state of the output torque of the engine based on the fuel injection amount of the engine detected with the fuel injection amount detection unit.

3. The hybrid construction machine according to claim 1, further comprising:
a turbo charger type supercharger provided in the engine; and
a boost pressure measuring unit that measures a boost pressure of the engine with the supercharger,
wherein the engine state determination unit determines the state of the output torque of the engine based on the load torque of the hydraulic pump detected with the load torque detection unit and the boost pressure of the engine measured with the boost pressure measuring unit.

4. The hybrid construction machine according to claim 1, further comprising:
a motor generator torque detection unit that detects output torque of the motor generator,
wherein the engine state determination unit determines the state of the output torque of the engine based on the load torque of the hydraulic pump detected with the load torque detection unit and the output torque of the motor generator detected with the motor generator torque detection unit.

5. The hybrid construction machine according to claim 1, further comprising:
at least one of a motor generator rotation speed detection unit that detects a rotation speed of the motor generator and a motor generator current detection unit that detects an electric current inputted in the motor generator,
wherein the engine state determination unit determines the state of the output torque of the engine based on at least one of the detected rotation speed of the motor generator and the detected electric current inputted in the motor generator.

6. A hybrid construction machine comprising:
an engine;
a hydraulic pump driven with the engine;
a hydraulic working unit driven with pressure oil discharged from the hydraulic pump;
a motor generator that transmits torque to the engine, and performs motive-power assistance to the engine and power generation;

a power storage device that supplies/receives electric power to/from the motor generator;

an engine rotation speed detection unit that detects a rotation speed of the engine;

an engine state determination unit that determines a state of output torque of the engine;

a load torque detection unit that detects load torque of the hydraulic pump;

an engine assistance limiting unit that, when the rotation speed of the engine detected with the ermine rotation speed detection unit is equal to or greater than a predetermined rotation speed, and the engine state determination unit determines that the output torque of the engine has not become a predetermined minimum torque, limits the motive-power assistance with the motor generator to the engine, or, when the load torque of the hydraulic pump detected with the load torque detection unit is lower than a predetermined torque, limits the motive-power assistance with the motor generator to the engine; and a target rotation speed setting unit that sets a target rotation speed of the engine, wherein, when the rotation speed of the engine detected with the engine rotation speed detection unit is equal to or greater than the predetermined rotation speed and the engine state determination unit determines that the output torque of the engine has become the predetermined minimum torque, or, when the load torque of the hydraulic pump detected with the load torque detection unit is equal to or greater than the predetermined torque, the engine assistance limiting unit limits the motive-power assistance with the motor generator to the engine when the target rotation speed of the engine set with the target rotation speed setting unit is lower than the rotation speed of the engine detected with the engine rotation speed detection unit.

7. A hybrid construction machine comprising:

an engine;

a hydraulic pump driven with the engine;

a hydraulic working unit driven with pressure oil discharged from the hydraulic pump;

a motor generator that transmits torque to the engine, and performs motive-power assistance to the engine and power generation;

a power storage device that supplies/receives electric power to/from the motor generator;

an engine rotation speed detection unit that detects a rotation speed of the engine;

an engine state determination unit that determines a state of output torque of the engine;

a load torque detection unit that detects load torque of the hydraulic pump;

an engine assistance limiting unit that, when the rotation speed of the engine detected with the engine rotation speed detection unit is equal to or greater than a predetermined rotation speed, and the engine state determination unit determines that the output torque of the engine has not become a predetermined minimum torque, limits the motive-power assistance with the motor generator to the engine, or, when the load torque of the hydraulic pump detected with the load torque detection unit is lower than a predetermined torque, limits the motive-power assistance with the motor generator to the engine; and a target rotation speed setting unit that sets a target rotation speed of the engine, wherein, when the load torque of the hydraulic pump detected with the load torque detection unit is lower than the predetermined torque, the engine assistance limiting unit does not limit the motive-power assistance with the motor generator to the engine when the engine state determination unit determines that the output torque of the engine has not become the predetermined minimum torque and the target rotation speed of the engine set with the target rotation speed setting unit is higher than the rotation speed of the engine detected with the engine rotation speed detection unit until the engine state determination unit determines that the output torque of the engine has become the predetermined minimum torque.

* * * * *